(12) United States Patent
Lawlor et al.

(10) Patent No.: US 10,453,145 B2
(45) Date of Patent: Oct. 22, 2019

(54) SYSTEM AND METHOD FOR VEHICLE REPAIR COST ESTIMATE VERIFICATION

(71) Applicant: Hartford Fire Insurance Company, Hartford, CT (US)

(72) Inventors: Michael John Lawlor, West Hartford, CT (US); Bethany Siddall, Haslet, TX (US)

(73) Assignee: Hartford Fire Insurance Company, Hartford, CT (US)

( * ) Notice: Subject to any disclaimer, the term of this patent is extended or adjusted under 35 U.S.C. 154(b) by 1258 days.

(21) Appl. No.: 14/265,696

(22) Filed: Apr. 30, 2014

(65) Prior Publication Data

US 2015/0317739 A1    Nov. 5, 2015

(51) Int. Cl.
| | | |
|---|---|---|
| *G06Q 40/00* | (2012.01) | |
| *G06Q 40/08* | (2012.01) | |
| *G06Q 30/02* | (2012.01) | |
| *G06Q 10/00* | (2012.01) | |

(52) U.S. Cl.
CPC .......... *G06Q 40/08* (2013.01); *G06Q 10/20* (2013.01); *G06Q 30/0283* (2013.01)

(58) Field of Classification Search
CPC .... G06Q 40/08; G06Q 30/0283; G06Q 10/06; G06Q 10/20
USPC ................................. 705/4, 1.1, 400, 29, 37
See application file for complete search history.

(56) References Cited

U.S. PATENT DOCUMENTS

| | | | |
|---|---|---|---|
| 5,504,674 A | | 4/1996 | Chen et al. |
| 5,950,169 A | * | 9/1999 | Borghesi ............ G06Q 30/0283 705/4 |
| 6,397,131 B1 | * | 5/2002 | Busch ................. B60R 16/0234 701/31.6 |
| 6,983,253 B1 | * | 1/2006 | Maul .................. G06Q 10/0875 705/1.1 |

(Continued)

FOREIGN PATENT DOCUMENTS

| | | | |
|---|---|---|---|
| JP | 09051200 A | * | 2/1997 |
| JP | 10170304 A | * | 6/1998 |
| KR | 2014070933 | * | 6/2014 |

OTHER PUBLICATIONS

Kleindorfer et al. "Challenges Facing the Insurance Industry in Managing Catastrophic Risks" January 1999, National Bureau of Economic Research, pp. 149-194.*

(Continued)

*Primary Examiner* — Kelly S Campen
(74) *Attorney, Agent, or Firm* — Howard IP Law Group

(57) ABSTRACT

A computer system for processing data for verification of vehicle repair estimates in connection with insurance claims includes an insurance claims database having data relating to insurance claims. One or more computer processors are configured to receive claim identifying data from a repair facility computer system; determine, based on the claim identifying data, an insurance claim associated with the claim identifying data; establish secure communication with the repair facility computer system; receive data indicative of a repair estimate associated with the insurance claim from the repair facility computer system; access an evaluation of the estimate based on a plurality of rules, compare the estimate to one or more thresholds, and forward the estimate to a claim handler system.

10 Claims, 17 Drawing Sheets

(56) References Cited

U.S. PATENT DOCUMENTS

| | | | |
|---|---|---|---|
| 7,835,945 B2* | 11/2010 | Scruton | G06Q 10/10 705/26.4 |
| 7,953,615 B2 | 5/2011 | Aquila et al. | |
| 8,015,036 B1* | 9/2011 | Leisure | G06Q 10/10 705/1.1 |
| 8,095,391 B2 | 1/2012 | Obora et al. | |
| 8,106,769 B1* | 1/2012 | Maroney | G06Q 10/10 340/540 |
| 8,200,707 B2 | 6/2012 | Littooy et al. | |
| 8,265,963 B1 | 9/2012 | Hanson et al. | |
| 8,311,856 B1 | 11/2012 | Hanson et al. | |
| 8,527,305 B1 | 9/2013 | Hanson et al. | |
| 8,694,341 B1 | 4/2014 | Hanson et al. | |
| 8,725,542 B1 | 5/2014 | Hanson et al. | |
| 8,725,543 B1 | 5/2014 | Hanson et al. | |
| 2003/0111525 A1* | 6/2003 | Sweeney | G06Q 10/087 235/376 |
| 2003/0112263 A1* | 6/2003 | Sakai | G06Q 40/02 715/716 |
| 2003/0154111 A1 | 8/2003 | Dutra et al. | |
| 2003/0171957 A1* | 9/2003 | Watrous | G06Q 10/06 705/4 |
| 2004/0243423 A1 | 12/2004 | Rix et al. | |
| 2005/0246206 A1 | 11/2005 | Obora et al. | |
| 2007/0136106 A1* | 6/2007 | Hart | G06Q 10/0875 705/4 |
| 2009/0048944 A1 | 2/2009 | Eagle | |
| 2015/0317739 A1* | 11/2015 | Lawlor | G06Q 30/0283 705/4 |

OTHER PUBLICATIONS

Busquets et al. "Orchestration in ICT-enabled Business Networks: A Case in the Repairs Industry" Dec. 2005, Association for Information Systems AIS Electronic Library (AISeL), BLED 2005 Proceedings. 38.*

* cited by examiner

Rule Details

Part Substitution Rule

Name: General Alt Part Rule        Description: General Alt Part Rule

Vehicle Consideration Criteria

If vehicle Age is ___ years Or Mileage is ___ miles

Part Selection Criteria

Then the following parts "BUMPER/GRILLE COVER, BUMPER COVER, BUMPER COVER ASSY, BUMPER AIR DEFLECTOR, BUMPER/GRILLE AIR DEFLECTOR, FENDER LINER, FENDER PANEL, GRILLE & FRAME ASSY, GRILLE GRILLE, H.LAMP ASSEMBLY, HIDDEN H.LAMP ASSEMBLY, COMBINATION LAMP ASSEMBLY, COMBINATION LAMP ASSY, H.LAMP CAPSULE ASSY, H.LAMP LENS & HOUSING, COMBINATION LAMP LENS & HOUSING, RETRACTABLE H.LAMP ASSEMBLY, H.LAMP ASSY, RETRACTABLE H.LAMP CAPSULE ASSEMBLY, HIDDEN H.LAMP CAPSULE ASSY, RETRACTABLE H.LAMP CAPSULE ASSY, HOOD PANEL, TAIL LAMP ASSEMBLY, TAIL/STOP LAMP BEZEL, TAIL LAMP BEZEL" should be RM or LK or AM

Vehicle Exclusion Criteria

Unless vehicle is: "Alfa Romeo All,Aston Martin All,Ferrari All,Lamborghini All,Lotus All,Rolls Royce All"

Non-Compliance Message: Please select an alternative part or document the file why an alternative part was not used.

☐ Read   ☐ Not

Close

*Fig. 7*

| Policy Identifier | Claim Identifier | Estimate Status | Repair Facility Identifier | Non-Compliant Items |
|---|---|---|---|---|
| 123_RT1 | 1255810 | 1 – Awaiting Estimate | AFHK_1234 | |
| 345_ST1 | 1255912 | 2 – Estimate Approved | BGHJ_2345 | |
| 678_DR2 | 1256045 | 3 – Estimate Failed, Awaiting Claim Handler Action | BGHJ_2345 | Exceeded Max. Labor Hours - Frame |
| 123_DX4 | 1256062 | 4 – Revised Estimate-Repair Facility Action | BGHJ_5523 | Partial Refinish Alert-Hood |

FIG. 8

SYSTEM AND METHOD FOR VEHICLE REPAIR COST ESTIMATE VERIFICATION

FIELD

Embodiments relate to data processing systems, including insurance data processing systems, including insurance data processing system relating to communication of vehicle repair cost estimates and verification of vehicle repair cost estimates for insurance purposes.

BACKGROUND

Insurance claims often relate to damage to vehicles. By way of example, a vehicle of an insured may be damaged in a collision or by vandalism, falling objects, or other causes. The damaged vehicle is usually taken to a repair facility, such as an automobile body shop. The automobile body shop inspects the vehicle, determines the parts and labor time necessary for the repairs, obtains part prices, uses applicable labor rates, and prepares an estimate for the repairs.

Insurers typically do not typically accept the body shop's estimate. The body shop's estimate may differ from an insurer's assessment of the cost of repairs for a variety of reasons. These reasons may include an insurer's assessment of the labor time involved in the repairs being lower than that in the body shop's estimate, the insurer's assessment of the prevailing labor rate being lower, and the insurer's assessment that certain parts are available at lower expense, by way of example. There is also a risk that the body shop's estimate includes one or more errors, such as replacement of a part which is not damaged, as well the possibility of fraud in the preparation of the estimate.

In order to assess the body shop's estimates, an insurer will typically assign an insurance adjuster to inspect, personally and on-site, the damaged vehicle. The adjuster will then prepare a report which can be used to generate the insurer's own cost estimate for the repairs. The insurer's cost estimate is then presented to the body shop. If the body shop disagrees with the insurer's cost estimate, the body shop and a representative of the insurer will then negotiate to attempt to reach agreement. Only once agreement is reached will repairs on the vehicle commence.

The insurer's costs associated with vehicle repairs thus include the time and expenses associated with a personal inspection by an adjuster of the damaged vehicle, as well the preparation of an estimate by the adjuster. If the body shop does not accept the insurer's cost estimate, the insurer's costs further include costs associated with the time of insurer representatives in negotiations with the body shop.

Systems and methods for verification of vehicle repair cost estimates submitted by repair facilities, while limiting the need for personal inspection by an insurance company adjuster of a damaged vehicle, would be desirable.

SUMMARY

In embodiments, a computer system for processing data for processing data associated with vehicle repair estimates in connection with insurance claims includes one or more data storage devices storing an insurance claims database having data relating to a plurality of insurance claims; one or more computer processors; a data communications device in communication with the one or more computer processors; and a memory device in communication with the one or more computer processors, and storing computer-readable instructions, which instructions, when executed by the one or more computer processors, cause the one or more computer processors to: access, via the data communications device, a vehicle repair rules database storing data indicative of a plurality of vehicle repair rules; receive claim identifying data from a repair facility computer system; determine, based on the claim identifying data, an insurance claim associated with the claim identifying data; receive data indicative of a repair estimate associated with the insurance claim from the repair facility computer system; access data indicative of an evaluation of the received repair estimate; and responsive to the data indicative of an amount of the repair estimate being below a first threshold, determine an insurance workflow to include forwarding the estimate for approval; responsive to the data indicative of an amount of the repair estimate being at least the first threshold, and the evaluation being indicative of one or more rules being triggered, determine an insurance workflow to include forwarding the estimate to a claim handler device for review; and responsive to the data indicative of an amount of the repair estimate being at least the first threshold, and the evaluation being indicative of no rules being triggered, determine an insurance workflow to include forwarding the estimate for approval.

In embodiments, a computer-implemented method of processing data relating to vehicle repair estimates associated with insurance claims includes: storing in one or more data storage devices an insurance claims database having data relating to a plurality of insurance claims; receiving, by one or more computer processors, claim identifying data from a repair facility computer system; determining, by the one or more computer processors, based on the claim identifying data, an insurance claim associated with the claim identifying data; receiving, by the one or more computer processors, data indicative of a repair estimate associated with the insurance claim, including data indicative of an amount, from the repair facility computer system; accessing, by the one or more computer processors, an evaluation of the received repair estimate, the evaluation being based on an application of a plurality of rules to the repair estimate; responsive to the data indicative of an amount of the repair estimate being below a first threshold, determining, by the one or more computer processors, an insurance workflow to include forwarding the estimate for approval; responsive to the data indicative of an amount of the repair estimate being at least the first threshold, and the evaluation being indicative of one or more rules being triggered, determining, by the one or more computer processors, an insurance workflow to include forwarding the estimate to a claim handler device for review; and responsive to the data indicative of an amount of the repair estimate being at least the first threshold, and the evaluation being indicative of no rules being triggered, determining, by the one or more computer processors, an insurance workflow to include forwarding the estimate for approval.

In embodiments, a computer system for processing data for verification of vehicle repair estimates in connection with insurance claims, includes a claim handler computer system configured to receive estimate data and display estimate data, including data indicative of rules triggered by an estimate; and an insurance data system in communication with the claim handler computer system via a local area network, and including one or more data storage devices storing: an insurance claims database storing data relating to a plurality of insurance claims and repair estimates, including at least one field for storing data indicative of status of vehicle repair estimates in a vehicle repair estimate workflow; one or more computer processors in communication with the insurance claims database; a communications device in communication with the one or more computer processors and in communication with a network; a memory device in communication with the one or more computer processors, and storing computer-readable instructions, which instructions, when executed by the one or more computer processors, cause the one or more computer processors to: receive claim identifying data via the communications device and the network from a repair facility computer system; determine, based on the claim identifying data, an insurance claim associated with the claim identifying data; receive data indicative of a repair estimate associated with the insurance claim from the repair facility computer system; access data indicative of an evaluation of the repair estimate, the evaluation being based on application of a plurality of estimate rules to the repair estimate; responsive to the data indicative of an amount of the repair estimate being below a first threshold, determine an insurance workflow to include forwarding the estimate for approval; responsive to the data indicative of an amount of the repair estimate being at least the first threshold, and the evaluation being indicative of one or more rules being triggered, determine an insurance workflow to include forwarding the estimate to a claim handler device for review; and responsive to the data indicative of an amount of the repair estimate being at least the first threshold, and the evaluation being indicative of no rules being triggered, determine an insurance workflow to include forwarding the estimate for approval.

BRIEF DESCRIPTION OF THE DRAWINGS

FIG. 5B is an illustration of a claim handler device displaying data associated with an estimate submitted by a repair facility, according to an illustrative embodiment of the invention.

FIG. 5C is an illustration of a claim handler device displaying data associated with an estimate determined to require review, according to an illustrative embodiment of the invention.

FIG. 5D is an illustration of a claim handler device displaying data associated with an estimate during claim handler updating, according to an illustrative embodiment of the invention.

FIG. 5E is an illustration of a claim handler device displaying data associated with an estimate revised by a claim handler, according to an illustrative embodiment of the invention.

FIG. 7 is an illustration of an administrator device showing an exemplary vehicle estimate rule setting, according to an illustrative embodiment of the invention.

FIG. 8 is an illustration of exemplary data fields in a database including vehicle repair estimate and insurance claim data according to an illustrative embodiment of the invention.

DETAILED DESCRIPTION

Disclosed herein are processor-executable methods, computing systems, and related technologies for verification of cost estimates provided by auto repair facilities, such as body shops and garages. The methods and systems disclosed herein may be implemented by insurance entities and third parties acting on behalf of insurance entities. In these methods and systems, following an automobile accident or other incident resulting in damage to a vehicle, an insured or other claimant contacts an insurance company to initiate a claim. The insurance company creates a record of the claim in its system. The claimant takes the damaged vehicle to a repair facility. The repair facility generates an estimate for the repairs to the damaged vehicle, and stores the estimate using the repair facility's computer system. The insurance company has established rules for evaluation and analysis of estimates for repairs. Those rules may be stored at a data storage device associated with, and applied by, an intermediary computer system, which receives the estimate data from the repair facility's computer system, applies the rules to the estimate data, and furnished the evaluation results to the insurance company computer system. The result of the evaluation may provide that the estimate is automatically approved, that a warning is associated with the estimate, or that the estimate is assigned to a claim handler for review. The system permits the claim handler to approve the estimate, or to annotate the estimate and provide the estimate back to the repair facility. The system then permits the repair facility to modify the estimate and return the estimate for analysis. Upon approval of an estimate, an insurance company computer system may cause approval information to be provided to the repair facility. Upon approval of the work performed by the repair facility, the insurance company system may provide payment instructions to banking systems to cause payment to be effected to the repair facility. The system provides for review and analysis of repair estimates associated with insurance claims with greater efficiency, by avoiding a need for in-person inspection of the damaged vehicle by an insurance adjuster. The system also permits efficient submission of the repair facility's estimate to the insurance company, and efficient review of the repair facility's estimate. The valuable time of claim handlers is allocated efficiently by providing an initial review prior to review by the claim handlers.

Figure 1:
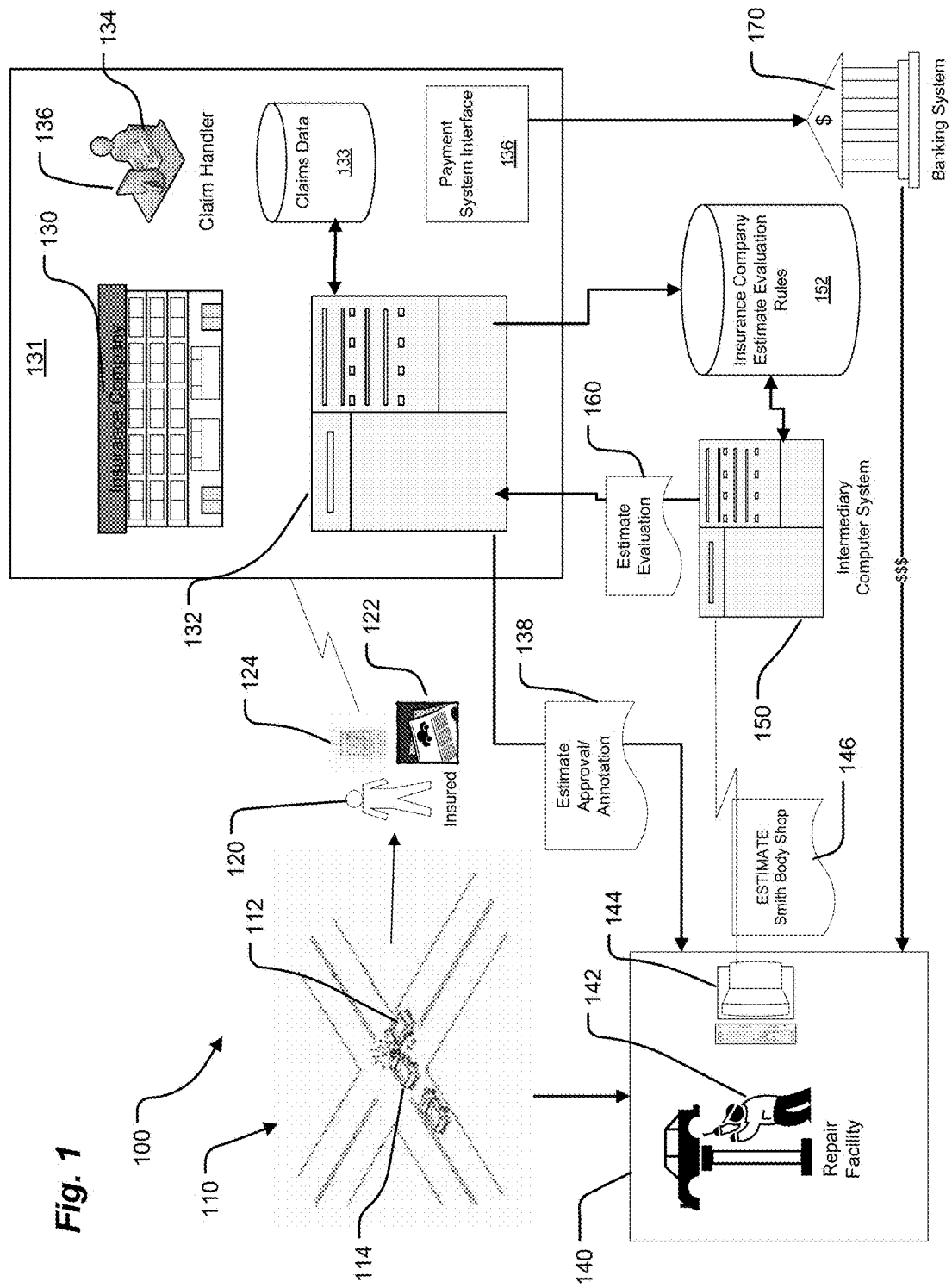
FIG. 1 illustrates an environment in which embodiments of the system and method of the invention may be implemented.

Referring to FIG. 1, an example of an environment 100 in which embodiments of the invention may be employed is shown. A vehicle collision 110 involving vehicles 112, 114 is shown. Vehicle 112, which sustains damage in vehicle collision 110, is owned by insured 120. Insured 120 is a policyholder under automobile insurance policy 122 issued by insurance company 130. Insured 120, using smart phone 124 in this example, submits a claim to insurance company 130 under insurance policy 122. The insurance company 130 includes, in insurance company environment 131, insurance company computer system 132. Insurance company computer system 132 generates an insurance claim and stores data associated with the insurance claim in claims database 133. Vehicle 112 is transported to repair facility 140, which may be an automobile body shop, garage or other repair facility, by way of example. At repair facility 140, a technician 142 examines damaged vehicle 112. The technician or other repair facility 140 personnel use repair facility computer system 144 to prepare an estimate 146 of the cost of repairs to vehicle 112. The estimate 146 may include data indicative of a list of parts required for the repairs, the cost of each part, a list of tasks to be performed, an estimated labor time for each of the tasks, and totals of part costs, labor time, and labor cost based on one or more applicable labor rates. The estimate 146 is associated with a corresponding claim, and is transmitted via a suitable communications channel to an intermediary computer system 150. The intermediary computer system 150 is configured to access and apply insurance company estimate evaluation rules from data storage device 152. The rules stored in data storage device 152 are determined based on instructions from insurance company computer system 132. The intermediary computer system 150 may provide an interface for access to rules selections, by insurance company computer system 132. The intermediary computer system computer system 150 may then evaluate estimate 146 using rules from data storage 152. The evaluation may include identification of rules applied, and whether the application of rules indicates one or more flags. The result of the evaluation may be embodied in estimate evaluation data 160, which is provided by intermediary computer system to insurance company computer system 132.

Insurance company computer system 132, based on the evaluation result, may determine that the estimate is approved. By way of example, the insurance company computer system may apply rules such as: If no flags are identified, the estimate is approved; or: If the estimate amount is below a threshold of dollar value, the estimate is approved. The approval may then be communicated as approval data 138 by the insurance company computer system 132 to the repair facility 140. Insurance company computer system 132 may determine that the estimate has failed. The determination of failure may be based on identification of one or more conditions, based on application of one or more rules, that result in a failure status. A determination of a warning, but not approval or failure, may be made, based on identification of one or more conditions, based on application of the rules, that result in a warning status. Upon determination of either failure status or warning status, the insurance company computer system 132 forwards the estimate to an individual human claim handler 134. The claim handler 134 may then override the warnings or failures using an interface on a user device 136 in communication with the insurance company computer system 132. The claim handler may prepare a modified or annotated estimate 138 to be provided via a suitable communications channel to repair facility computer system 144. Repair facility personnel may then modify the estimate and resubmit the estimate for application of the rules by intermediary computer system 150, and then further evaluation by insurance company computer system 132. Upon completion of work for an approved estimate, the insurance company computer system 132 and/or claim handler 134 may approve the estimate amount for payment. A payment system interface 136 may communicate with banking system 170 to effect payment to repair facility 140, based on instructions from insurance company system 132 or from claim handler 134.

Figure 2:
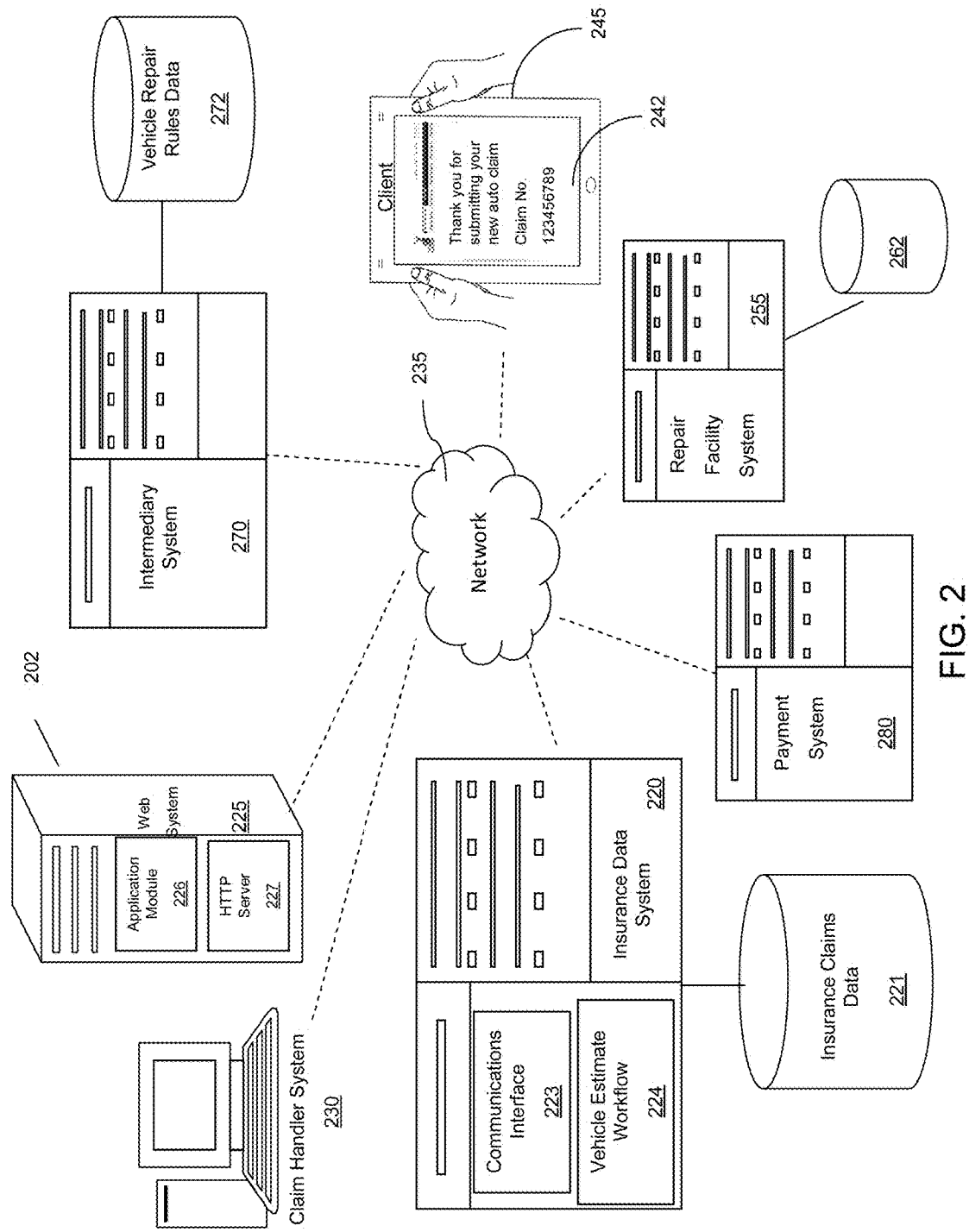
FIG. 2 illustrates an example computer architecture that may be used for data processing to implement embodiments of the system and method of the invention.

FIG. 2 shows an embodiment of an example architecture 202 that may be used for data processing to implement analysis and verification of vehicle repair estimates associated with insurance claims in an illustrative embodiment of the present invention. The example architecture 202 may include an insurance system 220, a web system 225, an insured device 245, a network 235, a claim handler device 230, a repair facility system 255, an intermediary computer system 270, and a payment system 280. In the example architecture 202 of FIG. 2, the insurance system 220, web system 225, payment system 280 and claim handler device 230, may be under the control of an insurance entity or a third party providing services to an insurance entity.

Referring still to FIG. 2, the insurance system 220 may include a communications interface module 223, a vehicle estimate workflow module 224, and an insurance claims database 221. The vehicle estimate workflow module 224 may include one or more software modules or objects and one or more specific-purpose processor elements to perform the calculations and processing required by embodiments of the present invention, such as: determining workflow steps for estimates based on evaluation results and other estimate data, forwarding estimate data to claim handler devices 230 for review, implementing approvals of estimates, communicating estimates annotated by a claim handler to a repair facility, estimates to repair facility systems, furnishing data relating to approved claims to one or more modules or systems to communicate approval to the insured and the repair facility system. The insurance system 220 may be configured to review time periods after one or more events to trigger a workflow, such as an automated tickler within one or more predetermined time periods to request repair status from the insured and/or the repair facility system.

The insurance claims database 221 may store information relating to claims, including claim identifiers, such as alphanumeric identifiers, automobile insurance policy information, or information as to other property and casualty insurance policies against which claims have been made, including such information as insured identification, term, coverage limits, vehicle identification; incident details, such as type of incident (e.g., collision, object falling on vehicle, etc.), incident date, incident report date, portion or portions of vehicle damaged, whether vehicle required towing, and other incident data; insured information, and other data relating to insurance claims. In embodiments, insurance claims database may include image data, such as photographs of damaged vehicles and scenes of accidents, video data showing images such as damaged vehicles and scenes of accidents, and audio data, such as audio recordings of statements by insureds and others.

Intermediary computer system 270 may include one or more modules to perform tasks associated with evaluation of vehicle repair estimates received from repair facilities. These tasks may include the selection applicable rules for a given vehicle type or repair type associated with estimate data, applying rules to estimate data, and determining a result of an analysis of estimate data, including determination of one or more conditions identified by application of one or more rules to estimate data.

Vehicle repair rules database 272 may include rules relating to vehicle repair. Rules may include rules to identify estimate items that result in pass, fail or warning. Examples of such rules include a rule that all estimates below a certain threshold dollar value, such as $1500, $2000, $2500 or $3000, are passed. Other examples include a rule that all estimates above a certain dollar value are failed. Rules may involve a large variety of factors. Factors used in rules may include vehicle make and model, vehicle year, part or parts to be replaced or repaired, labor time associated with particular tasks, total labor time, and other factors. Differing rules may be applied dependent on data associated with a repair facility. For example, a repair facility having an in-network status with the insurance company may have different rules from a repair facility having an out-of-network status with the insurance company.

In embodiments, intermediary computer system 270 may be configured to analyze image data associated with claims, such as photographs of damaged vehicles and damaged parts of vehicles. Logic may be implemented relating to such image data, such as comparing an image to stored data indicative of a shape of an undamaged car of a same make and model, and identifying areas of damage on the vehicle based on differences between the image data and the stored data. By way of example, the image data may include data indicative of body parts in a right front area having a shape not matching stored data, causing a system to conclude that a right front portion of a vehicle has been damaged. The rules may then compare a list of parts to be replaced or repaired in an estimate with a listing of parts in the right front portion of a vehicle. A part not in the right front area may be a condition determined based on application of the rules and therefore resulting in a flag of warning or fail for the estimate.

Databases 221, 272 may include data stored in one or more computer-readable storage media, and may be or include one or more relational databases, hierarchical databases, object-oriented databases, one or more flat files, one or more spreadsheets, and/or one or more structured files. Databases 221, 272 may be managed by one or more database management systems (not depicted), which may be based on a technology such as Microsoft SQL Server, MySQL, Oracle Relational Database Management System (RDBMS), PostgreSQL, a NoSQL database technology, and/or any other appropriate technology.

Communication between the insurance system 220 and the other elements in the example architecture 202 of FIG. 2 may be performed via the communications interface module 223 interacting with network 235. In an example, the insurance system 220 may also interface with third party systems and third party data, not shown, which may include for example databases of third party suppliers of data such as vehicle part cost data and labor time estimate data. In embodiments, insurance system 220 may employ elements of third party vehicle repair estimating tools.

Referring still to FIG. 2, the claim handler system 230 may perform functionality such as display of estimate evaluation results, providing interactive tools to permit claim handlers to prepare revised estimates and/or annotated estimates for submission to repair facility systems, permitting claim handlers to designate estimates for adjuster or appraiser in-person review, and other functionality to facilitate the role of claim handlers in providing further review, approval, denial and modification of vehicle repair estimates. In embodiments, the claim handler system may provide notifications to a claim handler of vehicle estimate workflow events, including time limits on review of estimates flagged by insurance data system 270 for warning or as failing, follow up on revised estimates provided to repair facilities after modification via the claim handler system, and other workflow steps.

Referring still to FIG. 2, payment system 280 may be configured to receive instructions from the insurance data system or the claim handler device to effect payment to the repair facility, such as by authorizing generation of printed checks or interfacing with a banking system to effect electronic funds transfer to an account of the repair facility.

Referring still to FIG. 2, a web site system 225 may provide a web site that may be accessed by insureds and other claimants operating a user client device 245. User client device 245 can include, but is not limited to cellular telephones, other wireless communication devices, personal digital assistants, pagers, laptop computers, tablet computers, smartphones, or combinations thereof. A user client device 245 may be part of a system or network of a third party, such as a network of an insured entity holding one or more policies issued by an insurance entity that operates insurance data system 220. In the illustrative embodiment of the present invention, user client device 245 may communicate with the web site system 225 that may be operated by or under the control of an insurance entity or other third party entity such as an outsourced type program provider entity or a third party administrator entity or program provider administrator entity. The web site system 225 may generate one or more web pages for access by client device 245, and may receive responsive information from the client device 245 such as insurance claim details, including policy identification, incident details such as date, time, other persons or entities involved and their respective insurance policy information, location, general nature of incident (e.g., multi-vehicle collision, single vehicle collision, damage by falling object such as tree branch, etc.), identification of a repair facility to which a damaged vehicle has been delivered, image data such as photographs and video of damaged vehicles and accident locations, audio data such as voice notes of claimants and others, and other information. The web site system 225 may then communicate this information to the insurance data system 220 for processing. The insurance data system 220 may communication via the website system 225 to provide additional pages, such as requests for additional information, requests for confirmation of submitted information, display of claim identification numbers, as shown at 242, and information regarding vehicle repair estimates, such as information regarding status of review, whether the estimate has been approved, whether a revised estimate has been furnished to the repair facility, whether the repair facility has accepted or declined the revised estimate, and other data relating to the claim and the estimate. The web site system 225 may also generate one or more web pages for use by the repair facility system in establishing a communications link between the repair facility system 255 and the intermediary system 270 and the insurance data system 220 for transmission of estimate data among the systems.

In embodiments, input of data via client device 245 may be accomplished via a touch-sensitive touch screen that provides an input interface and an output interface between the client device 245 and the client or user. The client device 245 displays visual output to the user for manipulation by the user. The visual output may include checkboxes, radio buttons, graphics, text, icons, video, and any combination thereof. The touch screen may display one or more graphics within the user interface displayed on device 245. In this embodiment, as well as others, a user may select one or more of the graphical elements by making contact or touching the graphics, for example, with one or more fingers or stylus implements. The input interface on client device 245 may permit the user to upload data, such as photographic and video data, or links to photographic and video data stored on other systems, such as cloud-based systems, to insurance data system in connection with submission of data pertinent to an insurance claim.

The web site system 225 may include a web application module 226 and a HyperText Transfer Protocol (HTTP) server module 227. The web application module 226 may generate the web pages that make up the web site and that are communicated by the HTTP server module 227. The web application module 226 may be implemented in and/or based on a technology such as Active Server Pages (ASP), PHP: Hypertext Preprocessor (PHP), Python/Zope, Ruby, any server-side scripting language, and/or any other appropriate technology.

The HTTP server module 227 may implement the HTTP protocol, and may communicate HyperText Markup Language (HTML) pages and related data from the web site to/from the consumer client device 245 using HTTP. The HTTP server module 227 may be, for example, a Sun-ONE Web Server, an Apache HTTP server, a Microsoft Internet Information Services (IIS) server, and/or may be based on any other appropriate HTTP server technology. The web site system 225 may also include one or more additional components or modules (not depicted), such as one or more switches, load balancers, firewall devices, routers, and devices that handle power backup and data redundancy.

Referring still to FIG. 2, the client device 245 may include a web browser module 242, which may communicate data related to the web site to/from the HTTP server module 227 and the web application module 226 in the web site system 225. The web browser module 242 may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module 242 may implement Rich Internet Application (RIA) and/or multimedia technologies such as Adobe Flash, Microsoft Silverlight, and/or other technologies. The web browser module 242 may implement RIA and/or multimedia technologies using one or web browser plug-in modules (such as, for example, an Adobe Flash or Microsoft Silverlight plugin), and/or using one or more sub-modules within the web browser module 242 itself. The web browser module 242 may display data on one or more displays that are included in or connected to the client device 245, such as a liquid crystal display (LCD) display, organic light-emitting diode (OLED) display, touch screen or monitor. The client device 245 may receive input from the user of the client device 245 from input devices (not depicted) that are included in or connected to the client device 245, such a mouse or other pointing device, or a touch screen, and provide data that indicates the input to the web browser module 242.

The example architecture 202 of FIG. 2 may also include one or more wired and/or wireless networks within network 235 via which communications between the elements illustrated in the example architecture 202 may take place. The networks may be private or public networks, and/or may include the Internet. In one example deployment scenario, the insurance system 220, web site system 225, payment system 280, and claim handler system 230 may communicate via one or more private networks that are under the control of the financial services/insurance company, while the client device 245 and repair facility system 255 may communicate with the web site system 225 via the Internet.

Each or any combination of the modules 223, 224 shown in FIG. 2 may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 2, these modules 223, 224 shown may perform functionality described later herein.

In embodiments, insurance data system 220 may be in communication with vehicle repair rules database 272 for determining and modifying rules in accordance with instructions provided by insurance company personnel.

Figure 3:
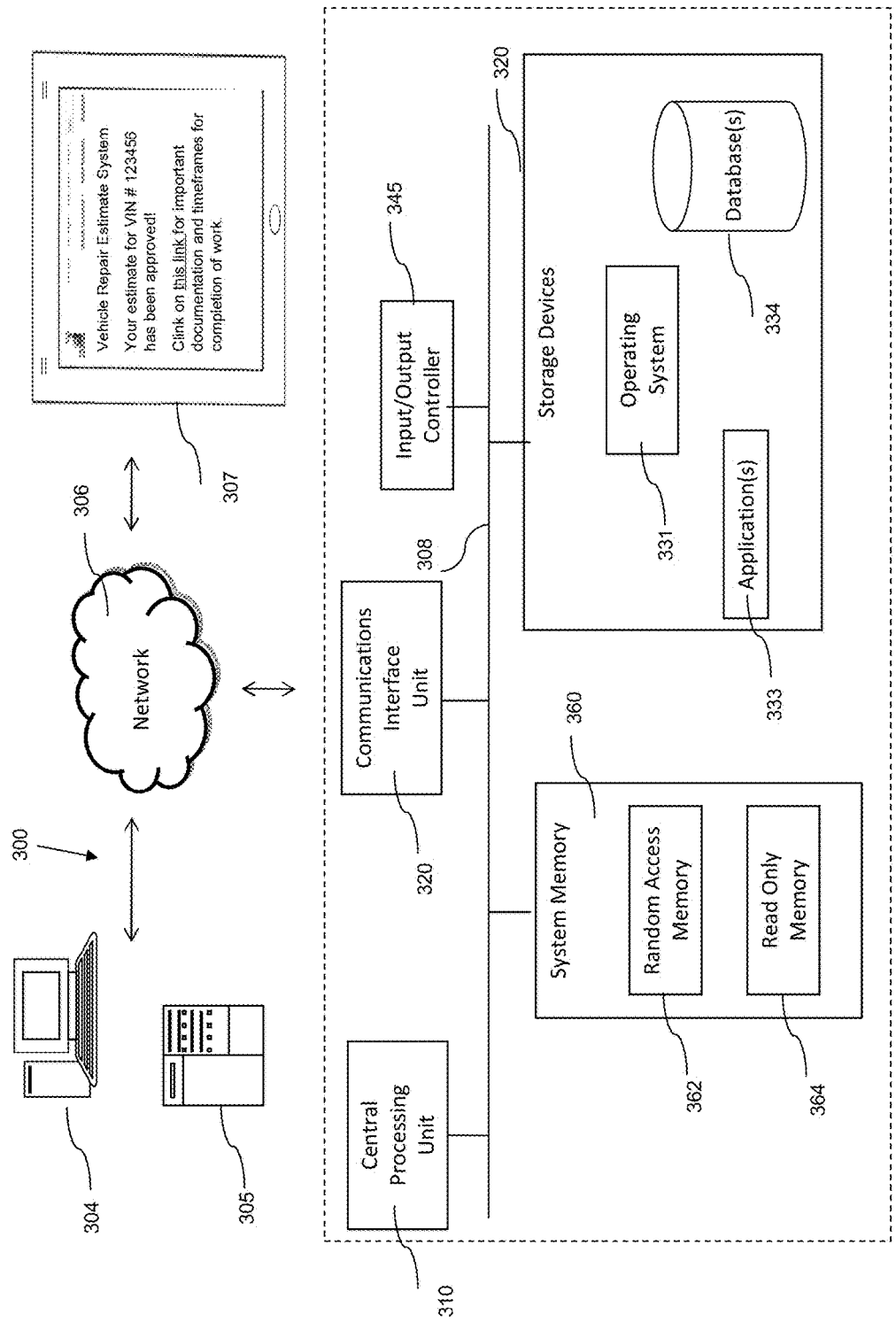
FIG. 3 illustrates an exemplary computer system for use in an illustrative embodiment of the invention.

Referring to FIG. 3, an exemplary computer system 300 for use in an illustrative embodiment of the invention will now be described. Computer system 300 may be configured to receive vehicle repair estimate evaluations, determine whether vehicle repair estimates may be approved, disapproved or failed, or flagged with a warning, and provide vehicle repair estimates to claim handler systems 304 and communicate with other computer systems to facilitate vehicle repair estimate reviews. System 300 may interface with claim handler system 304, repair facility representative device 307, and vehicle part data system 305, by way of example, via a network 306. In computer system 300, a central processing unit or processor 310, which may include one or more processors, executes instructions contained in one or more programs such as vehicle repair estimate evaluation application program 333, stored in one or more memories, such as storage devices 330. Processor 310 may provide the central processing unit (CPU) functions of a computing device on one or more integrated circuits. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Storage devices 330 may include suitable media, such as optical or magnetic disks, fixed disks with magnetic storage (hard drives), tapes accessed by tape drives, and other storage media. Processor 310 communicates, such as through bus 308 and/or other data channels, with communications interface unit 320, storage devices 330, system memory 360, and input/output controller 345. System memory 360 may further include a random access memory 362 and a read only memory 364. Random access memory 362 may store instructions in the form of computer code provided by application 333 to implement embodiments of the present invention. System 302 further includes an input/output controller 345 that may communicate with processor 310 to receive data from user inputs such as pointing devices, touch screens, and audio inputs, and may provide data to outputs, such as data to video drivers for formatting on displays, and data to audio devices.

Storage devices 330 are configured to exchange data with processor 310, and may store programs containing processor-executable instructions, and values of variables for use by such programs. Processor 310 is configured to access data from storage devices 330, which may include connecting to storage devices 330 and obtaining data, or reading data from the storage devices, or place data into the storage devices. Storage devices 330 may include local and network accessible mass storage devices. Storage devices 330 may include media for storing operating system 331 and mass storage devices such as storage 334 for storing data such as insurance claim data, vehicle estimate data, insurance workflow data, and other applicable data. Communications interface unit 320 may communicate via network 306 with claim handler systems 304, vehicle repair facility representative system 307, vehicle repair cost data system 305, as well as other servers and computer systems, such as intermediary computer systems that apply rules to vehicle repair estimates, computer systems of insureds, claimants, vehicle repair facilities and third party administrators, remote sources of data, and with systems for implementing instructions output by processor 310.

Computer systems depicted in FIG. 3 may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SASTM, ATP, Bluetooth, GSM and TCP/IP. Network 306 may be or include wired or wireless local area networks and wide area networks, and over communications between networks, including over the Internet. One or more public cloud, private cloud, hybrid cloud and cloud-like networks may also be implemented, for example, to handle and conduct processing of one or more transactions or calculations of embodiments of the present invention, including determination of whether vehicle repair cost estimates are approvable, by way of example. Cloud based computing may be used herein to handle any one or more of the application, storage and connectivity requirements of embodiments of the present invention. Furthermore, any suitable data and communication protocols may be employed to implement embodiments of the present invention.

With reference still to FIG. 3, communications interface 320 may be used for receiving claim data and vehicle estimate evaluation data, as well as data indicative of claim handler review decisions of vehicle estimates, by way of example. Computer processor 310 executes program instructions, such as provided by the application 333 to receive, via the communications interface 320, claim data, vehicle estimate data and claim handler decision data, and other related information. Database 334 may include evaluation data determined by central processing unit 310, as well as received data stored in the database by central processing unit 310.

Figure 4A:
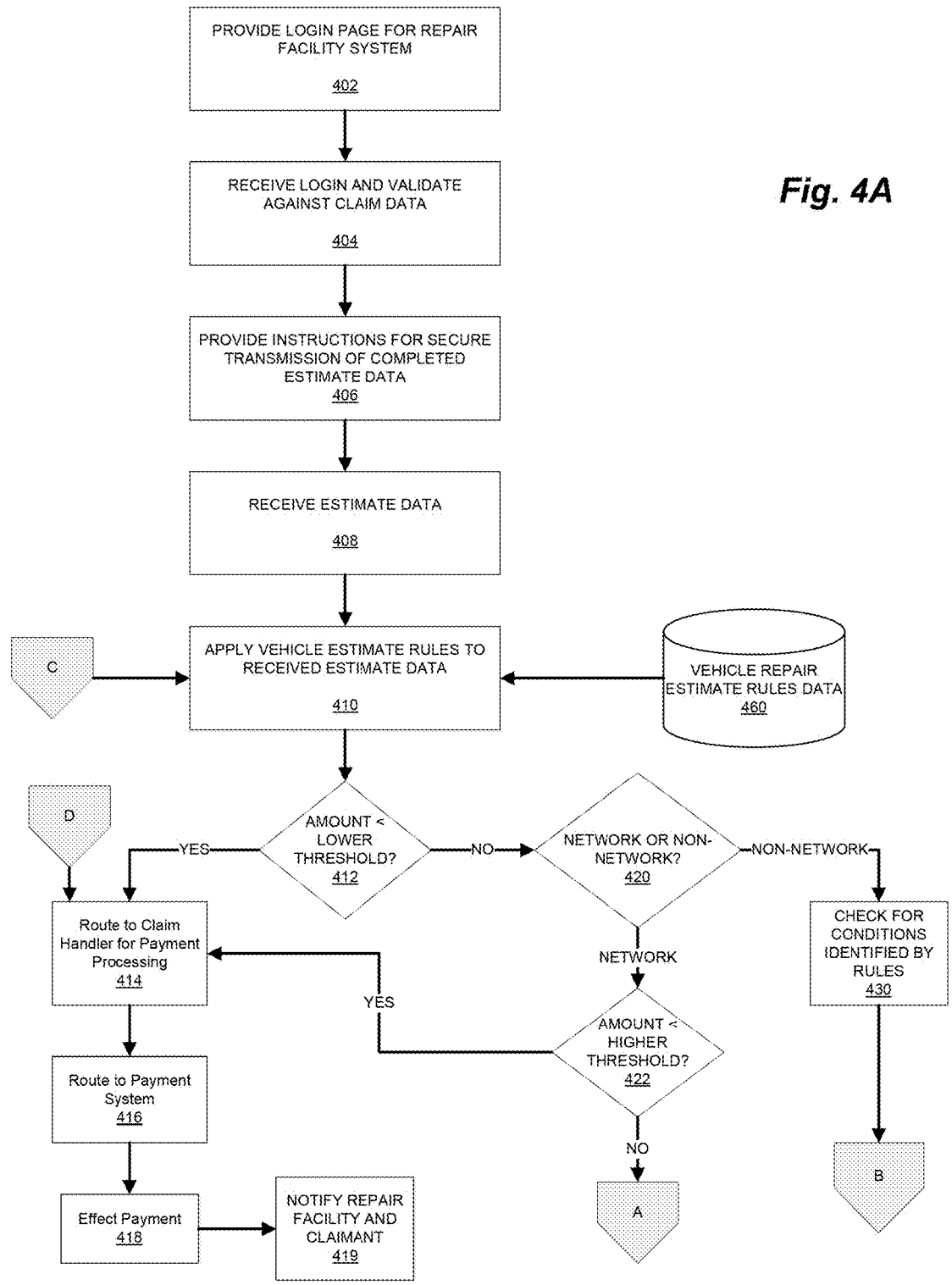
FIGS. 4A and 4B are a flow diagram of a computer-implemented process according to some embodiments of the invention.
Figure 4B:
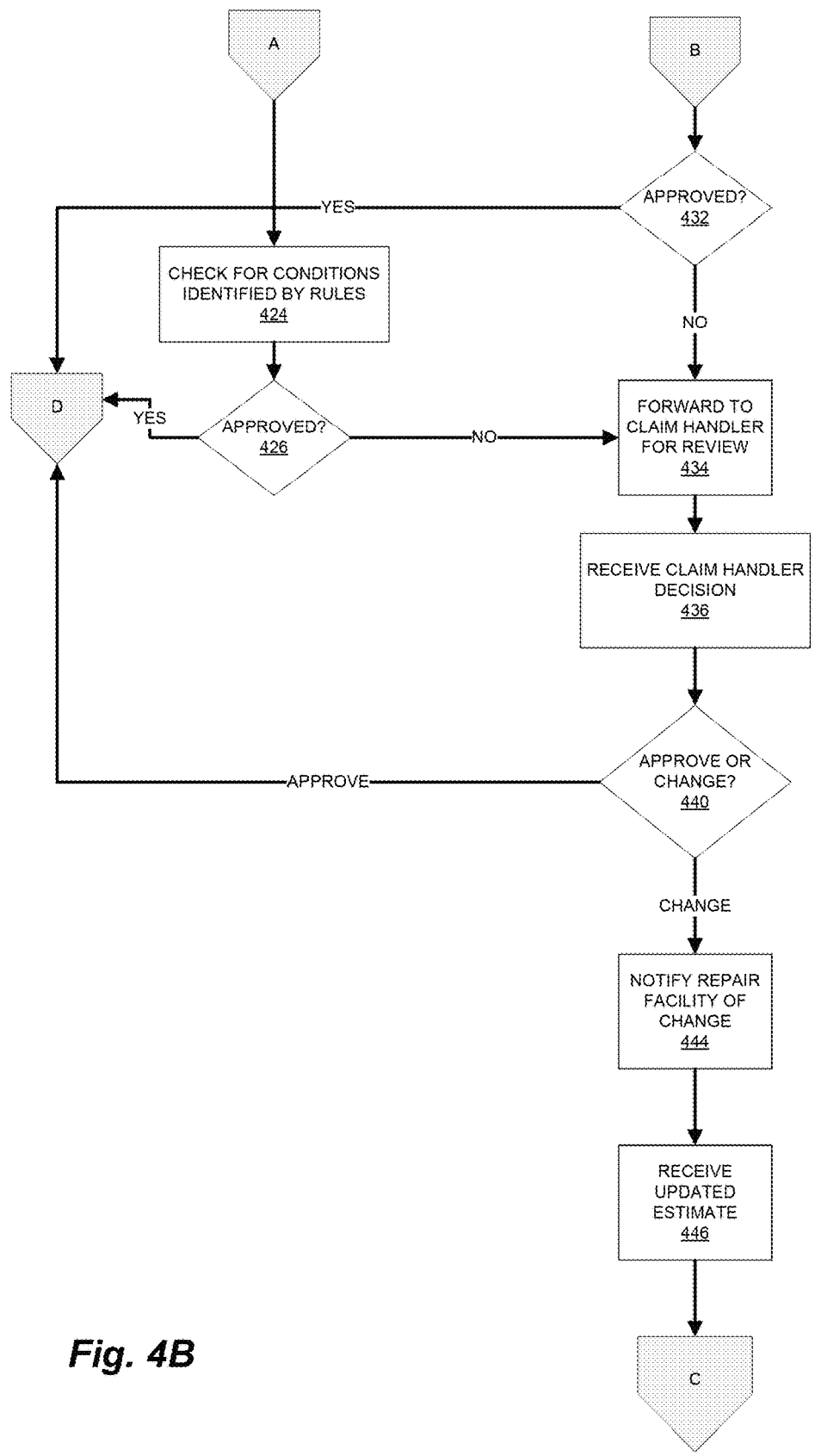

FIGS. 4A and 4B are a flow diagram of process 400 according to some embodiments. Elements of process 200 may be executed by systems such as insurance system 200 and intermediary system 270 of FIG. 2. Referring to FIG. 4A, a system such as insurance system 200 provides 402 a login page for a repair facility computer system. The login page may be provided via a web page generated by a system such as a web site system 225 of FIG. 2. The login page may provide a prompt for an identifier associated with a claim. The identifier may be, by way of example, the vehicle identification number (VIN) of the vehicle for which the estimate has been prepared. In embodiments, the identifier may be a claim number. The insured or other claimant may have provided the claim number to the facility.

The system receives 404, via the web site system 225, the login information. The received information is validated against the claim data. If the received information correlates with an existing claim, then the system may proceed with instructions for providing of completed estimate data 406. If the received information does not correlate with an existing claim, the system may prompt for re-entry of data. If a further re-entered data fails, then the system may, in accordance with a workflow module, provide claim data for a claim handler system, for a claim handler to review, telephone the repair facility, or take other available steps.

In embodiments, the providing of estimate data may include providing estimate data via a suitable protocol to an intermediary computer system, such as intermediary computer system 270 of FIG. 2. Providers of such intermediary computer systems configured for evaluation of vehicle repair estimates include Mitchell International, Inc., CCC Information Services, Inc., and American Computer Estimating, Inc., by way of example. In some embodiments, the repair facility computer system may be configured with an existing protocol for forwarding repair estimate data to an intermediary system. In some embodiments, the system may provide instructions for secure transmission of completed estimate data. These instructions may include instructions to provide access to executable code, by download of code or by remote access of code running on the insurance data system, to configure a portion of the claim handler's data storage device as a virtual drive of the insurance data system, by way of example. Upon successful execution, the user may be prompted to load the estimate data into the virtual drive. The insurance data system may monitor the virtual drive for information, or the system may prompt the user to provide an indication of loading of the estimate data into the virtual drive. Upon confirmation, the estimate data is uploaded and received.

In embodiments, the vehicle estimate data is received 408. The vehicle estimate data may be received at an intermediary system, which applies rules determined by the insurance company to the estimate. In embodiments, the vehicle estimate data may be received at an insurance data system or other computer system controlled by an insurance company, and not at an intermediary system.

A receiving computer system, whether an insurance data system or an intermediary system, may provide format translation, error checking and other data management operations on the estimate data after receipt. If errors, such as incomplete information, a VIN not corresponding to the VIN associated with a claim in the insurance data system, or other errors are identified, the receiving computer system may notify the repair facility, such as by providing, via a web system, a notification screen for display on the repair facility system.

In embodiments, the repair facility system may employ a third party estimating system that provides for storage of estimate data on a remote data storage device under control of the third party estimating system. If the insurance company data system has credentials for access to the third party estimating system data, the insurance company data system may provide instructions for the user of the third party estimating system to provide access to the estimate via the third party estimating system.

Following receipt of the estimate data, and passing by the estimate data of any format translation, error-checking and verification steps, the process flow proceeds to application of the vehicle estimate rules, from the vehicle repair estimate rules database 460, to the received estimate data 410. The application of rules may result in identification of conditions, such as rules that have been fulfilled, or rules that have been violated, that affect the evaluation of the vehicle repair estimate. In embodiments, the application of the vehicle estimate rules provides a number of possible results.

In embodiments, a system may determine 412 whether the estimate amount is below a lower threshold value. The lower threshold value may be expressed in currency, and may be any value in the range from $500 to $1500, for example. Responsive to determining that the estimate amount is below the lower threshold value, the system may route 414 the estimate to a claim handler, with instructions, provided for example on a screen display on a claim handler system when the claim handler accesses the estimate, to process payment. The claim handler may prepare instructions for payment, including amount, reference information, such as estimate number, claim number, policy number or VIN number, recipient information, such as name and address, recipient account information, such as routing number and account number, which are routed 416 to a payment system. Responsive to receipt of the instructions, the payment system may effect payment, such as by providing instructions to the insurance company's bank for an electronic funds transfer, or by effecting printing and mailing of a paper check. The process flow proceeds to notification of the repair facility and the claimant of the approval. The notification of the repair facility may involve the generation of web pages including notification data, e-mails, text messages, and other modes of notification, including terms and conditions of the approval.

In an embodiment, responsive to the system determining that the estimate amount is at least the lower threshold value, the system determines 420 whether the estimate is from a network shop or a non-network shop. A network shop is a shop with which the insurance company has an existing relationship, which may be embodied in a contractual relationship, by way of example. The determination may be made by accessing one or more data fields already associated with the estimate that have a value of network or non-network, or by accessing repair facility identifying information from the estimate, and comparing the repair facility identifying information with a listing of network repair facilities, by way of example. Responsive to determining that the estimate is from a network shop, the system compares the estimate to a second threshold value, higher than the lower threshold value. Responsive to determining that the estimate is not greater than the second threshold value, the system may route 414 the estimate to a claim handler, with instructions, provided for example on a screen display on a claim handler system when the claim handler accesses the estimate, to process payment. Processing then proceeds to step 416 as above.

Responsive to determining that the amount is not above the higher, second, threshold 422, the system proceeds, as shown on FIG. 4B, to checking for conditions identified by rules 424. These conditions may include, depending on application of rules, that an estimate met a rule that indicates a warning or a failure, or that an estimate violated a rule required to avoid a determination of warning or failure. The process flow proceeds 426 to a determination of whether the estimate was approved. Responsive to determining that the estimate was approved, the estimate is forwarded to a claim handler for payment, and the process flow proceeds to step 416 above.

Responsive to determining that the evaluation indicates one or more conditions indicative of a warning or failure status, the system proceeds to forward the estimate to the claim handler for review 434.

Referring again to FIG. 4A, responsive to determining that the repair facility is a non-network repair facility, the process flow proceeds to checking for conditions identified by rules 430. These conditions may include, depending on application of rules, that an estimate met a rule that indicates a warning or a failure, or that an estimate violated a rule required to avoid a determination of warning or failure. Referring now to FIG. 4B, the process flow proceeds 432 to a determination of whether the estimate was approved. Responsive to determining that the estimate was approved, the estimate is forwarded to a claim handler for payment, and the process flow proceeds to step 416 above. Responsive to determining that the evaluation indicates one or more conditions indicative of a warning or failure status, the system proceeds to forward the estimate to the claim handler for review 434.

The process flow continues with receipt of the claim handler decision 436. If the claim handler decision is an approval 440, then the process flow proceeds to processing for payment. If the decision is a change in the estimate as compared to the estimate provided by the repair facility, then the process flow proceeds to notification 444 of the repair facility of the change. The repair facility then has the option of submitting an updated estimate, which is received at 446. The process flow then proceeds, as indicated by reference C, to application of the vehicle estimate rules to the received estimate data 410, on FIG. 4A.

In embodiments, the repair facility may decline to submit a new estimate. In that event, the claimant may have the option of proceeding with repairs, but with a non-approved estimate. In that event, the claimant will be responsible for the cost of repairs.

Figure 5A:
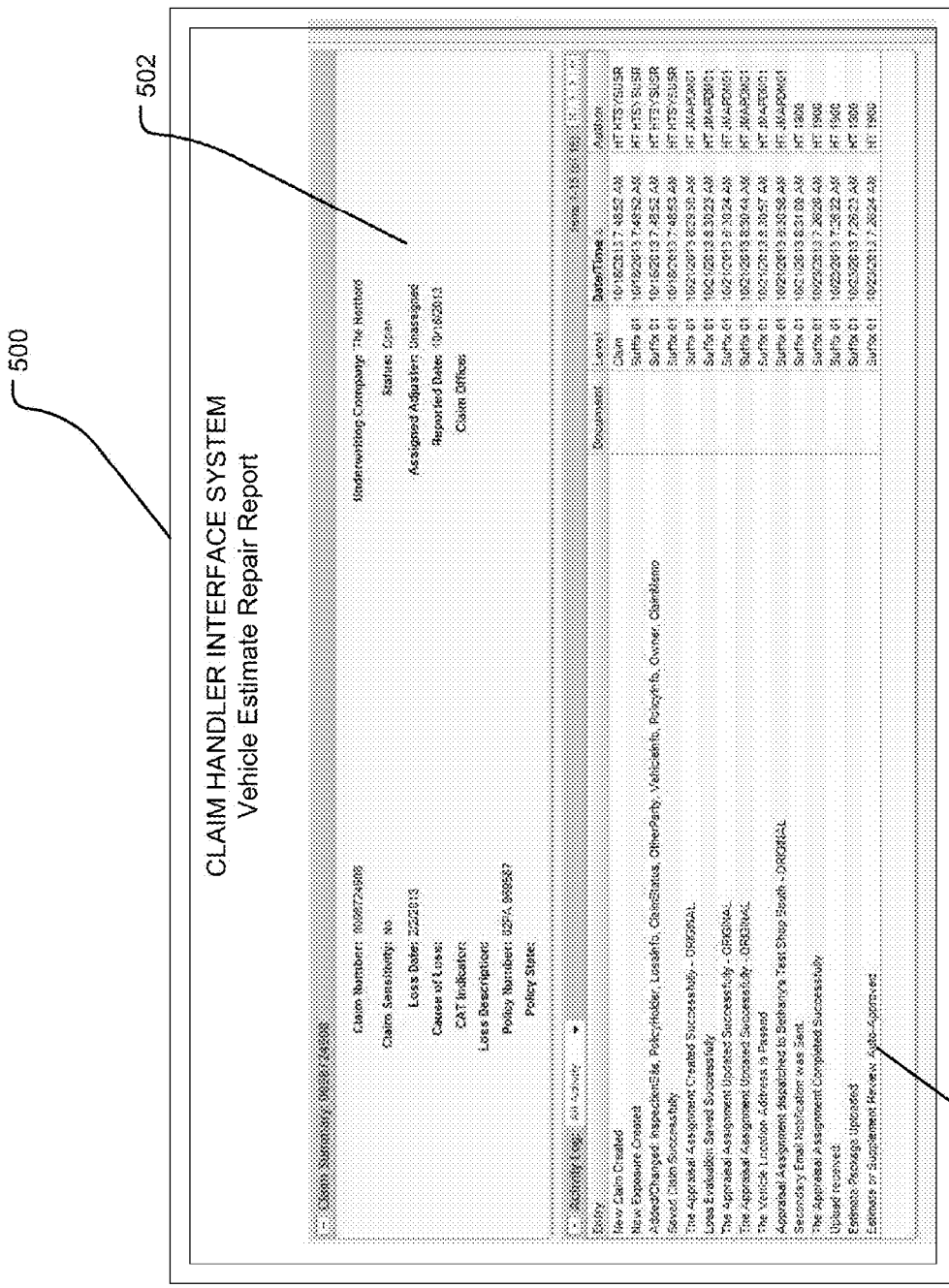
FIG. 5A is an illustration of a claim handler device displaying data associated with a listing of events associated with an estimate, according to an illustrative embodiment of the invention.
Figure 5B:
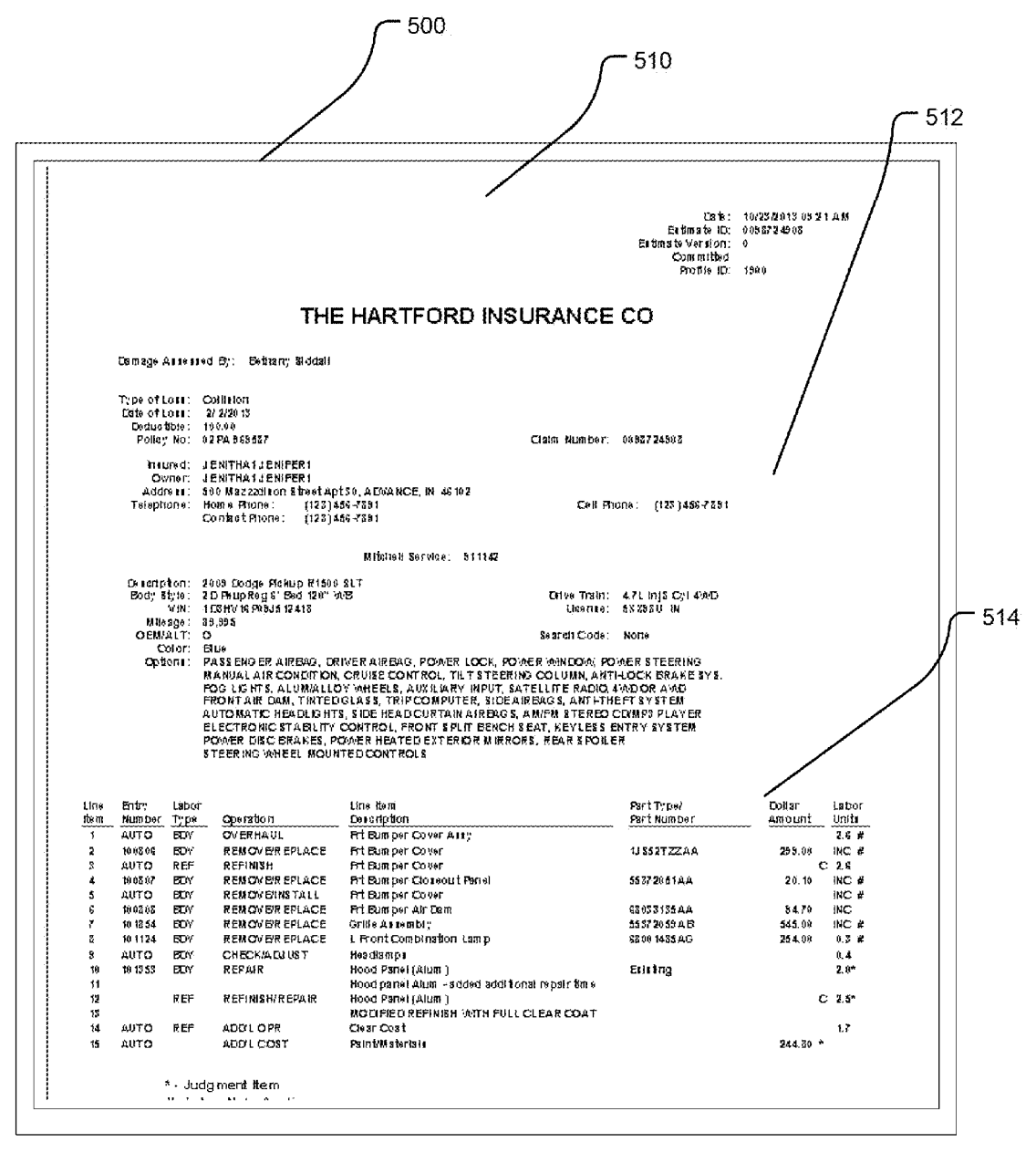
Figure 5C:
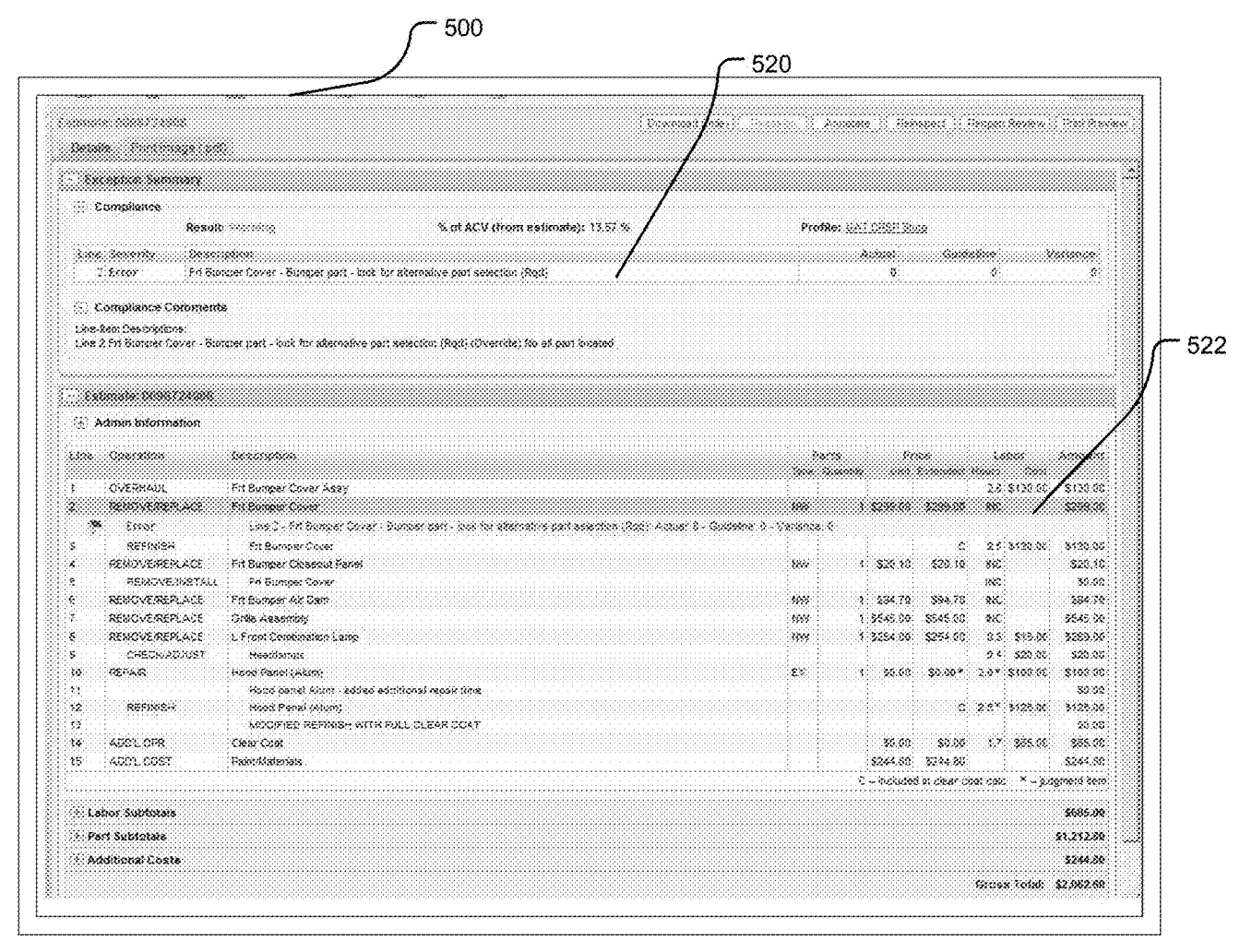
Figure 5D:
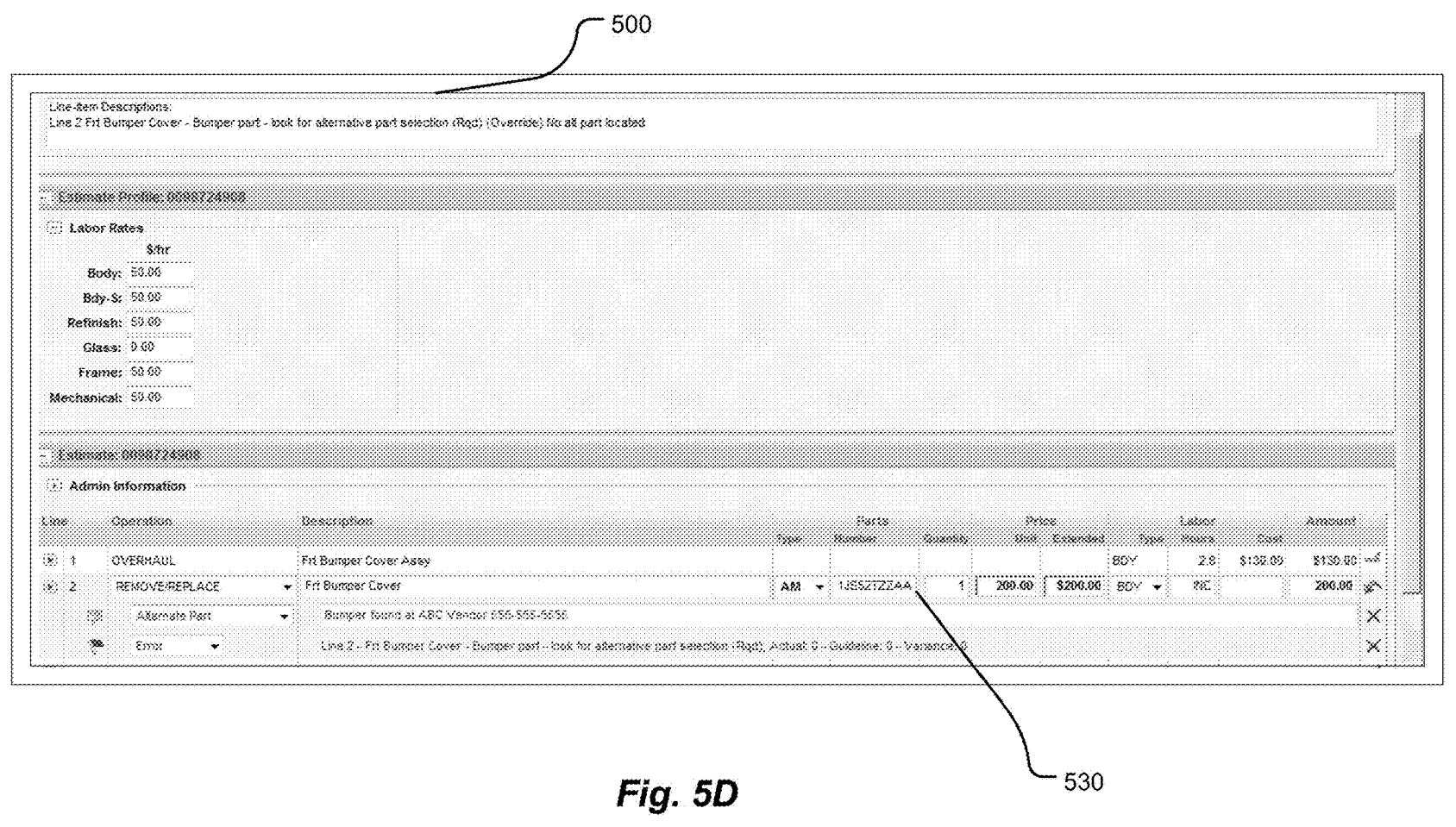
Figure 5E:
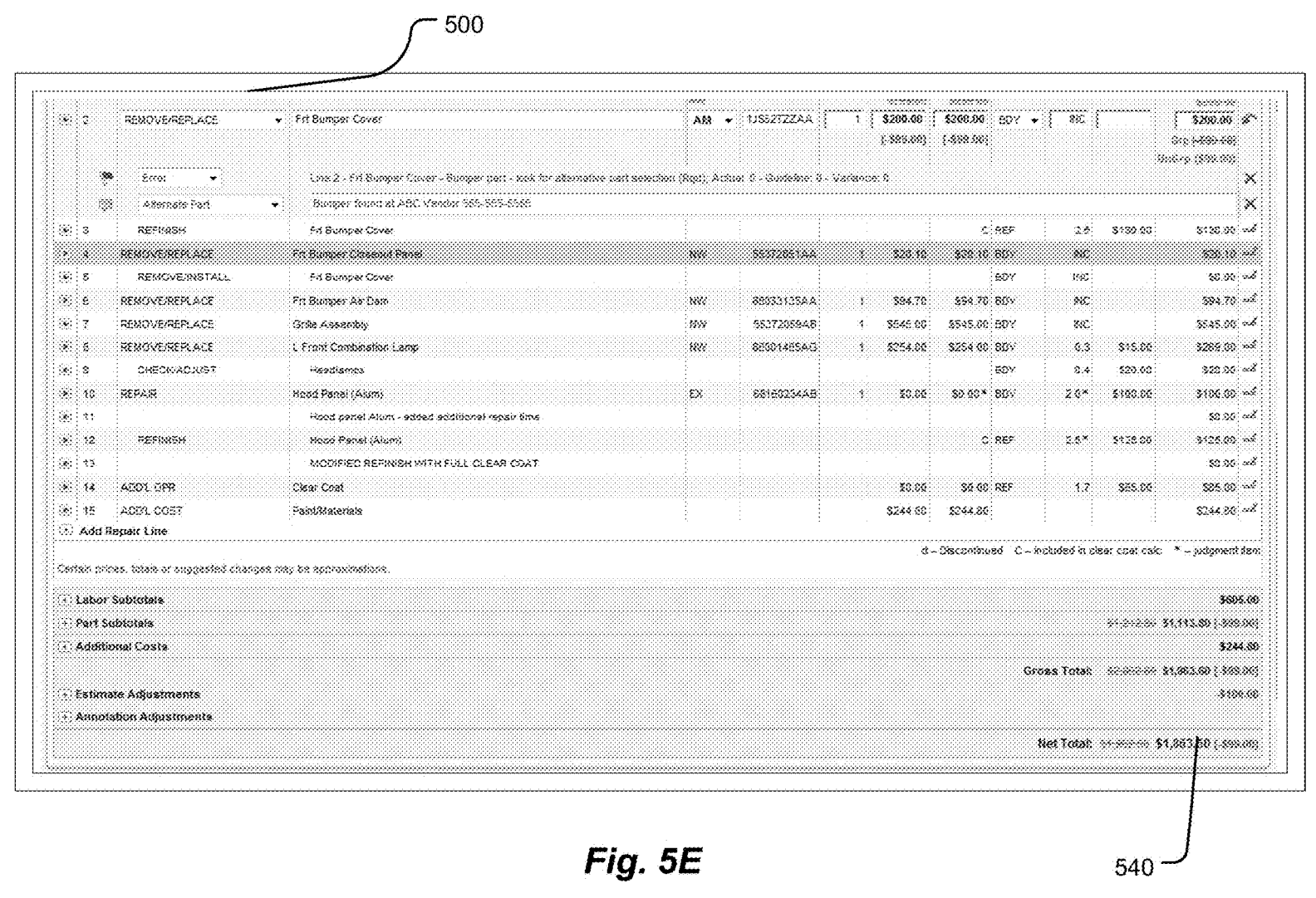
Figure 5F:
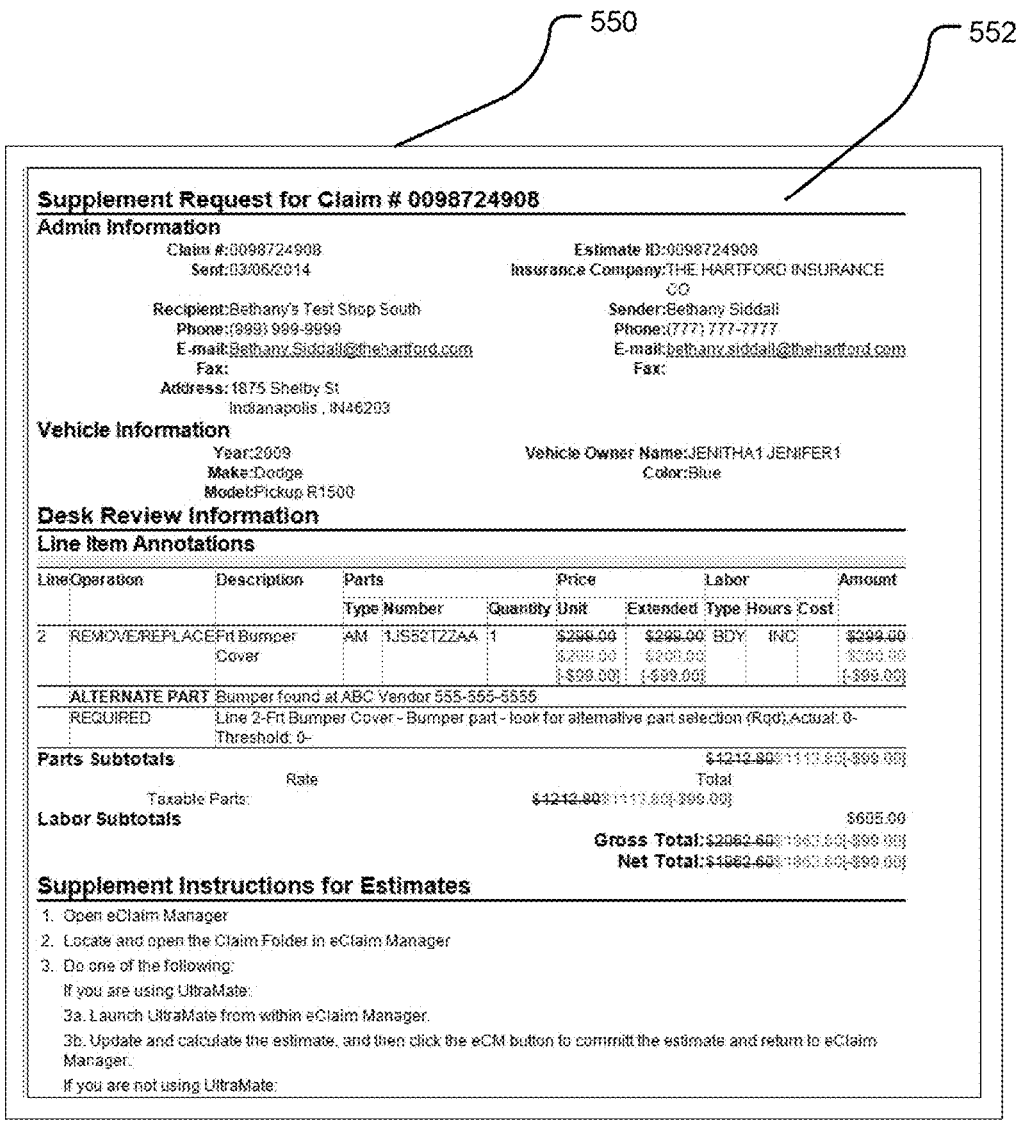
FIG. 5F is an illustration of a repair facility device displaying a communication requesting a revised estimate following claim handler review and revision, according to an illustrative embodiment of the invention.

At the claim handler system, the estimate may be assigned to a claim handler, who is notified of the claim, such as by a display as shown in FIG. 5A.

Referring to FIG. 5A, the claim handler device 500 may include a display of claim data, which may be generated by a web page server or other system for rendering displays. The header area 502 includes general data relating to the claim, including claim number, a loss date, a loss cause, a loss description, a policy number, a policy state, an underwriting company, a status, an identification of an assigned adjuster or claim handler, a report date and a claim office. Each of these data items may be obtained from an insurance claim database for display on the web page. At 504, a listing of events in the claim history are shown, including an identification of the type of event, such as new claim created, appraisal assignment, an identification of related documents, if any; an identification of date and time of the event, and an identification of an author, which may include an individual and/or system components.

In this example, the display identifies a specific part, as to which the claim handler is required to select an alternative part. In embodiments, the claim handler may have an option to approve the identified part. The system may require the claim handler to enter text or select from a drop down menu to document the reason for selection of the identified part.

The part may have been rejected for the reason that the part in the estimate is an original equipment manufacturer part, while a part of equivalent functionality is available from a less expensive source. The system may be configured to display options for claim handler action, including override and approve the estimate, prepare a modified estimate with changes as indicated in each of the listing of non-compliant items, and direct submission of the modified estimate to the repair facility for acceptance or negotiation, or prepare a modified estimate with changes including only some of those indicated in the listing of non-compliant items for submission to the repair facility for acceptance or negotiation. In embodiments, the claim handler may have the option to declare the car totaled, i.e., to decide that, as the market value of the car is less than the cost of repair, the insurance company will pay the owner for the market value of the vehicle in exchange for title to the vehicle.

Referring to FIG. 5B, the claim handler device 500 is shown illustrating a display of an estimate 510 received from a repair facility. An upper portion of the estimate 512 includes general information relating to the claim, the insured, the owner, the policy and the vehicle. A lower portion 514 includes each item included in the estimate, including a description of a part, a description of the labor item, a part number where applicable, and either a dollar amount or a labor time in hours and tenths of hours for each item. The data identified in lower portion 514 is data of the type to which rules are applied in a system of embodiments of the invention. The particular rules vary according to data in section 512, such as data relating to make, model, year, mileage and options associated with the vehicle.

Referring now to FIG. 5C, claim handler device 500 is shown illustrating a display of an evaluation of an estimate according to an embodiment of the invention. In an upper portion 522 of the display, a listing of all conditions warranting claim handler review is shown. In this example, the condition is identified as an "error," and indicates that a different part should be identified. In a lower portion 524 of the display, each item of the estimate is shown, with separate columns for numbers of parts, and a calculation of labor cost based on time from the estimate and an applicable rate. The item identified by the evaluation as an error is shown, along with an identification of a correction.

Referring now to FIG. 5D, claim handler device 500 is shown illustrating a display including fields, in which the claim handler has provided alternate part information, including part number, source and price, generally at 530. In embodiments, the system may be configured to populate the fields via data received from a vendor system, or to receive data input directly by a claim handler or other operator.

Referring now to FIG. 5E, claim handler device 500 is shown illustrating a display of a recalculated estimate total, after incorporation of the alternate part information of FIG. 5D. The system has recalculated the estimate amount, using the alternate part information, to provide a new total at 540. The system then generates a communication to the repair facility to request a revised estimate.

Process 400 and all other processes mentioned herein may be embodied in processor-executable program instructions read from one or more non-transitory computer-readable media, such as a floppy disk, a CD-ROM, a DVD-ROM, a Zip™ disk, a flash drive, and a magnetic tape, and then stored in a compressed, uncompiled and/or encrypted format. In some embodiments, hard-wired circuitry may be used in place of, or in combination with, program instructions for implementation of processes according to some embodiments. Embodiments are therefore not limited to any specific combination of hardware and software.

Figure 6:
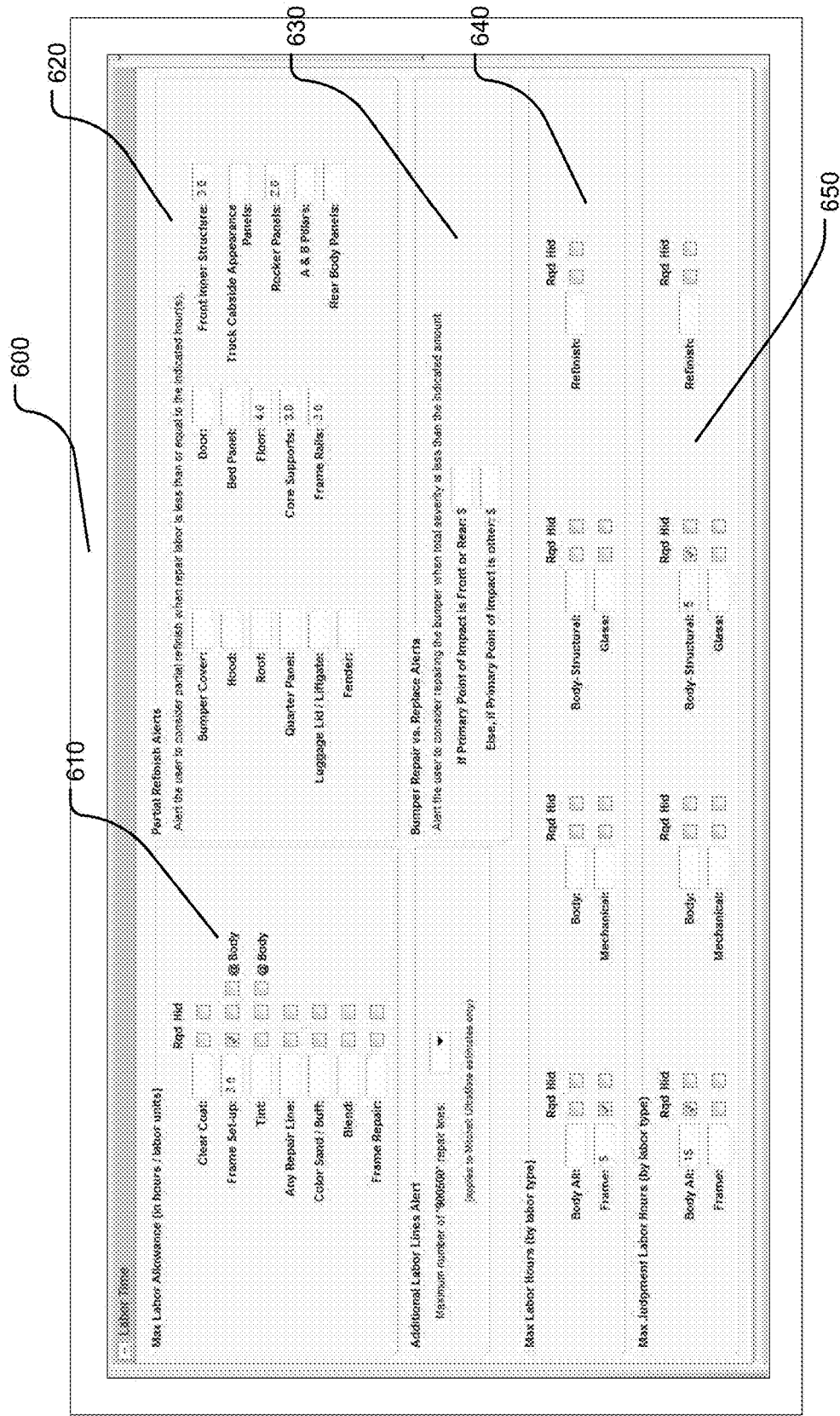
FIG. 6 is an illustration of an administrator device showing available selections for vehicle estimate rules settings, according to an illustrative embodiment of the invention.

Referring now to FIG. 6, an illustration is provided of an administrator device showing available selections for vehicle estimate rules settings, according to an illustrative embodiment of the invention. Administrator device 600 displays a portion of a screen of a vehicle estimate repair rules administrator module, showing exemplary rules relating to labor time for various items. The system permits the administrator to select and deselect certain rules, and to determine whether violation and/or satisfaction of those rules result in a warning, by checking the "Hid" or "Hidden," check box, or whether violation and/or satisfaction of those rules results in a failure of an estimate, by checking the "Rqd," or "Required," check box. The rules indicated at 610 provide for maxima labor time for a selection of specific types of activities. The rules indicated at 620 provide for warning that a partial refinish, as opposed to replacement, may be available for particular items. Similarly, at 630, a maximum bumper repair versus replace alert is provided. At 640 and 650, maximum labor hours by labor type are available. These rules options are exemplary of rule options available in embodiments of the present system.

Referring now to FIG. 7, an illustration of an administrator device 700 showing an exemplary vehicle estimate rule setting interface, according to an illustrative embodiment of the invention, is depicted. Interface portion 710 shows criteria, which may be set by a user, for vehicle age minimum or vehicle mileage minimum invoking a rule. The exemplary rule shown is a general alternative part rule, detailed at interface portion 720. The rule requires that listed parts be associated with one of the codes RM, LK or AM, and in general not be new, original equipment parts. Interface portion 730 identifies exclusion criteria for application of the rule. In this example, certain manufacturers' vehicles are excluded from application of the rule. Interface portion 740 provides the user an option of checking neither box, in which case the rule is not applied to any vehicles, checking the "Hid" box, in which case a rule violation triggers a warning, and checking the "Rqd" box, in which case meeting or triggering a rule results in an estimate being deemed failed. Subject to other rules, such as threshold estimate value rules, a failed estimate is forwarded by the system to a claim handler device for review.

FIG. 8 shows an exemplary database structure 800 that may be implemented as database 221 of FIG. 2, or database 334 of FIG. 3. Database structure 800 may be implemented as an analytic, management, operational, flat-file, rational, or hierarchical database in a standalone, network, or distributed configuration or as part of a database management system (DBMS) that interact with the user, other applications, and the database itself to capture and analyze data for use in loss control and preemptive claim management such as MySQL, MariaDB, PostgreSQL, SQLite, Microsoft SQL Server, Oracle, SAP, dBASE, FoxPro, IBM DB2, LibreOffice Base and FileMaker Pro. Database 800 includes a number of database column fields 810, 820, 830, 840 and 850 and a number of database rows 860, 862, 864 and 866. Column fields 810, 820, 830, 840 and 850 may correspond to one or more fields such as policy identifier, claim identifier, estimate status, repair facility identifier and violated rules. Illustrative estimate status identifiers correspond to steps in the process flow, including that the estimate has not yet been received from the repair facility, that the estimate has been received but has not yet passed error checking and/or data translation steps, that the estimate has been evaluated and approved, that the estimate has been evaluated and failed and is awaiting claim handler review, that a revised estimate has been provided to the repair facility and is awaiting repair facility review, and similar status identifiers for revised estimates received from a repair facility. Other fields may relate to features of the vehicle, such as manufacturer, model, year, mileage, and other vehicle data. In embodiments, additional fields may include pointers to image data showing vehicle damage. This image data may be provided by the owner, by the repair facility or obtained by the system from third party sources. The column fields may further correspond to a listing of rules that have been violated or that result in a warning. Generally, database structure 800 permits a system to populate fields shown in the displays of FIGS. 5A, 5B and 5C, as well as facilitating other system functionality. The system further is configured to update the content of the database as events occur in the process flow of an estimate. The database rows 860, 862, 864 and 866 show data associated with one policy and one claim associated with the policy.

Figure 9:
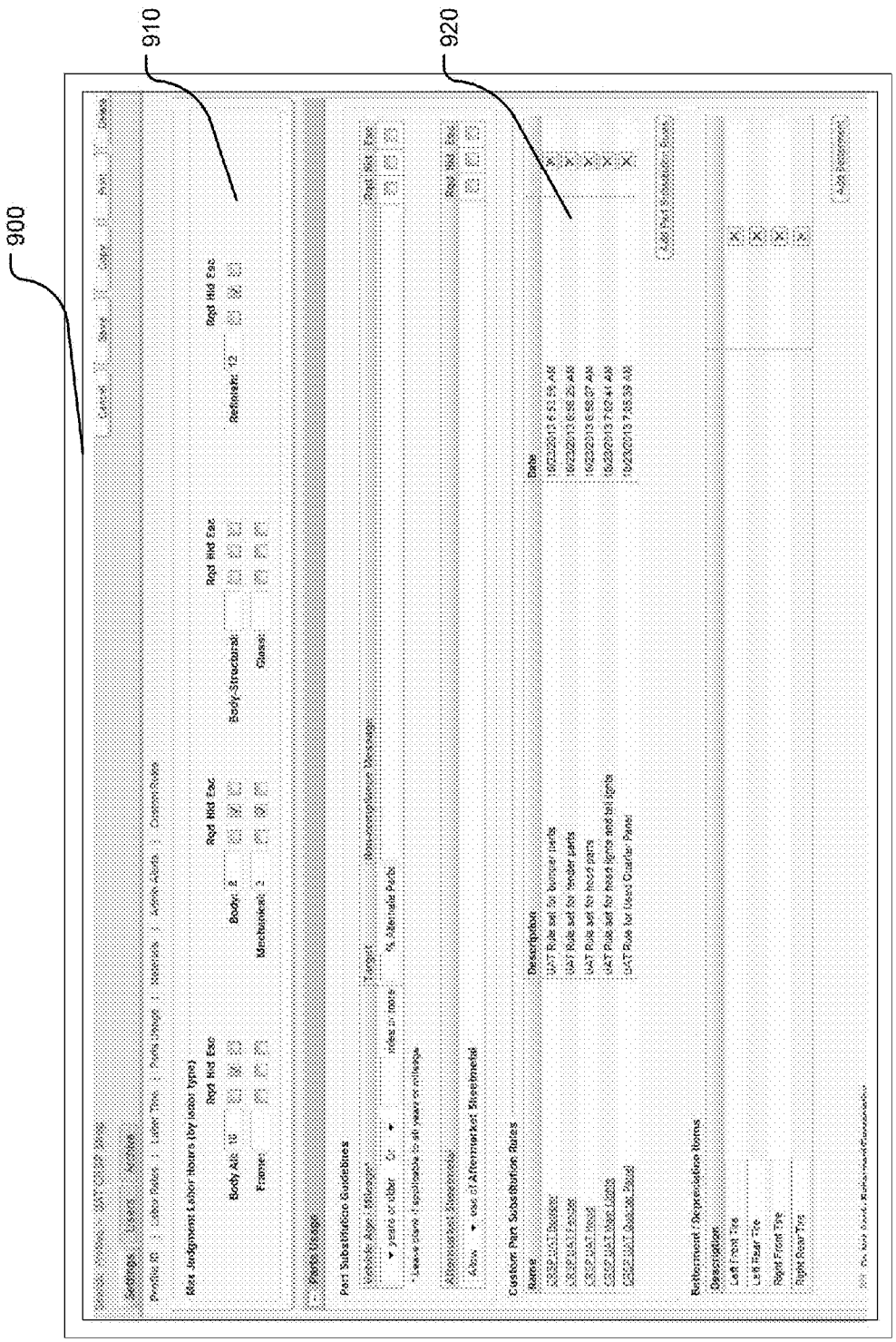
FIG. 9 is an illustration of an insurance company personnel device displaying estimate rule selection options according to an illustrative embodiment of the invention.

FIG. 9 is an illustration of an insurance company personnel device 900 displaying estimate rule selection options according to an illustrative embodiment of the invention. Options are provided for maximum labor hours in display portion 910, and showing options for severity of triggering of a rule, and in display portion 920 guidelines based on vehicle characteristics for part substitution guidelines, and part substitution rules for application to estimates.

Figure 10:
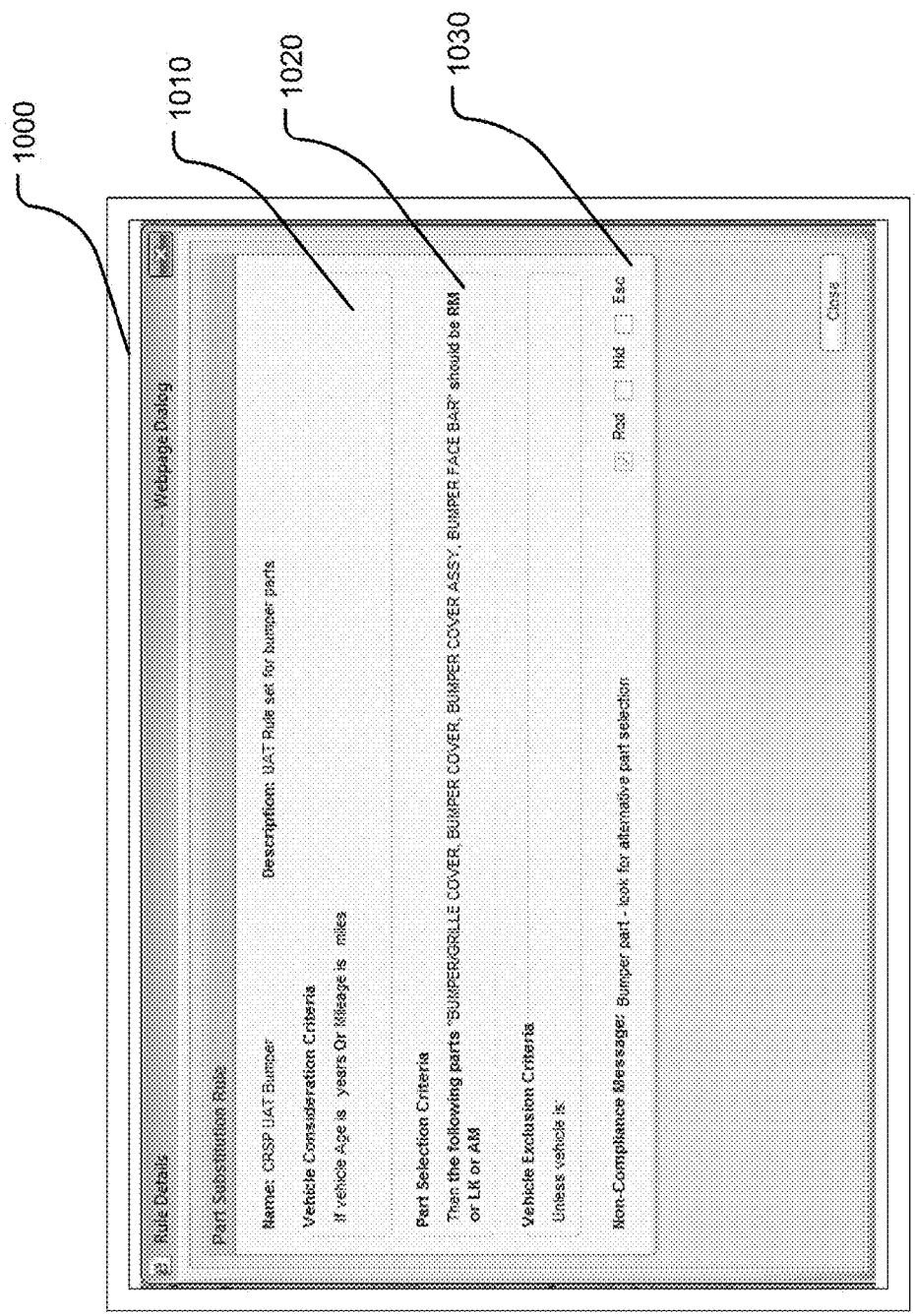
FIG. 10 is an illustration of an insurance company personnel device displaying estimate rule selection options according to an illustrative embodiment of the invention.

FIG. 10 is an illustration of an insurance company personnel device 1000 displaying estimate rule selection options according to an illustrative embodiment of the invention. Options are provided in area 1010 for vehicle characteristic rules, in area 1020 for part-specific rules based on a triggering of a vehicle characteristic rule, and at 1030 for a severity of a rule trigger.

The rules database may include rules including the following exemplary rules. In the exemplary rules of Table 1 below, state specific rules are noted:

TABLE 1

| Compliance Profile Name | Labor Rate Rules | Labor Time Rules | Part Usage Rule | Materials | Admin Alerts | Custom Rules |
|---|---|---|---|---|---|---|
| Staff General | None | None | General Alt Part* | None | None | None |
| Staff MN & MA | None | None | Prohibit A/M* | None | None | None |
| Staff NH | None | None | NH Part Rule* | None | None | None |
| Staff RI, WV, TN, IN & AR | None | None | RI, WV, TN, IN & AR* | None | None | None |
| NNS | None | Frame | General Alt Part* | Towing | VIN | |

In the exemplary rules of Table 2 below, types of threshold rules are provided:

TABLE 2

| Name | Purpose |
|---|---|
| Use Threshold rules for Staff | If No -- Staff packages will be auto approved without passing through threshold rules. If Yes -- Staff packages will be passed through threshold rules. |
| Compliance | If enabled and set to: PASSED -- The estimate must have passed the Compliance Audit WARNING -- The estimate can have warnings but cannot have failed the Compliance Audit. |
| Gross Estimate Threshold | If enabled total Estimate amount must be below the threshold |
| Percentage of ACV | If enabled Estimate total must be less than the threshold |
| Mechanical hours threshold | If enabled the total mechanical hours must be less than the threshold |
| Mechanical total threshold | If enabled the total mechanical total dollar amount must be less than the threshold |
| Gross Estimate Difference | If enabled the difference between the combined gross total of all supplements and the original must be less than the threshold. Example: Gross total of original is 1000 Threshold is set to 500 Supp 1 is 499 for a gross total of 1499 = Auto approved Supp 2 is 11 for a gross total of 1510 = Sent for Review |

Table 2A provides exemplary settings for the rules of Table 2 for certain repair facilities:

TABLE 2A

| Name | Value |
|---|---|
| Use Threshold rules for Staff | Yes |
| Compliance | Warning |
| Gross Estimate Threshold | FALSE |
| Percentage of ACV | FALSE |
| Mechanical hours threshold | FALSE |
| Mechanical total threshold | FALSE |
| Gross Estimate Difference | |

In Table 2A, a setting of "FALSE" indicates that the rule is not applied.

Table 2B provides exemplary settings for the rules of Table 2 for a second set of repair facilities:

TABLE 2B

| Name | Value |
|---|---|
| Use Threshold rules for Staff | Yes |
| Compliance | Warning |
| Gross Estimate Threshold | FALSE |
| Percentage of ACV | FALSE |
| Mechanical hours threshold | FALSE |
| Mechanical total threshold | FALSE |
| Gross Estimate Difference | FALSE |

Table 2C provides exemplary settings for the rules of Table 2 for non-network repair facilities. These are repair facilities with which the insurer does not have an existing agreement or arrangement. Certain threshold settings that are not enabled for repair facilities of Tables 2A and 2B, including thresholds for a gross estimate value, a percentage of the vehicle value, and a difference in gross estimates, are enabled and given values in Table 2C.

TABLE 2C

| Name | Value |
|---|---|
| Use Threshold rules for Staff | Yes |
| Compliance | Warning |
| Gross Estimate Threshold | 2500 |
| Percentage of ACV | 70 |
| Mechanical hours threshold | FALSE |

TABLE 2C-continued

| Name | Value |
| --- | --- |
| Mechanical total threshold | FALSE |
| Gross Estimate Difference | 750 |

In embodiments, one or more rules and related computer program code, which, when executed by one or more processors, causes the one or more processors, to evaluate estimate data with respect to the one or more rules, may be stored on and executed by a repair facility device. Examples of repair facility devices which may store and execute such program code include desktop computer systems, laptop computer systems, notebook computer systems, tablets, smartphones, personal digital assistants, file server systems, thin client devices, as well as application service provider and cloud-based systems. The rules stored and applied by a repair facility device may include all of the rules applied by an intermediary system or an insurance data system in other embodiments. Alternatively, the rules stored and applied by a repair facility device may include a subset of rules applied by an intermediary system or an insurance data system. By way of example, the rules stored and applied by a repair facility device may include only a selected number of rules. In embodiments, an insurance data system or another system may access and analyze records in order to determine which rules are most frequently as leading to disapproval and/or revision of estimates. Those rules, or a subset of those rules, may be provided to a repair facility device for application to estimates prior to transmission of the estimate to an intermediary system or an insurance data system. The program code may cause the repair facility device to display a warning message to an operator that the estimate will not be approved, or permit the estimate to be forwarded to another system for complete review, depending on the result of the review. If the warning message is provided, the warning message may identify the item in the estimate that will not be approved, and one or more options, such as a lower labor time for the task, a lower price for the part, or that the item is not to be completed. The operator may then modify the estimate, and resubmit the modified estimate for a second review by the local program code. The second review will then result in another warning message, or permitting forwarding of the estimate.

In embodiments, computer program code, which, when executed by one or more processors, causes the one or more processors, to translate estimate data between formats, may be stored on and executed by a repair facility device. Such computer program code may be made available for download and installation from a web system, by way of example. By way of example, a repair facility device may have stored and execute program code for estimation software and associated data storage, involving data formats, field identifiers, and other features, which differ from the data formats and field identifiers of the estimating software system used by one or more of the intermediary system and the insurance data system. The computer program code for translation may serve to translate data from one or more formats to a format employed by the intermediary system or the insurance data system.

In embodiments, upon approval of an estimate, one or more systems may be configured to furnish to a repair facility documentation relating to work to be performed. The systems may be configured to furnish the documentation for all repair facilities, only for non-network repair facilities, or for a different subset of repair facilities. The documentation may include information as to requirements for time of completion, contact information at the insurer for any issues, requirements as to inspection and acceptance of the repaired vehicle by the consumer, maintenance of copies of receipts and other documentation to verify that the authorized parts have been acquired, documentation of completed work by photographs and/or video of completed work, and other requirements. The documentation may be submitted as a web page, e-mail, text messages or other mode of communication. The documentation may include functionality to prompt the user to acknowledge one or more items in the documentation, such as by clicking check boxes or pressing buttons on a web page. If a system, such as an insurance data system, does not receive confirmation of acknowledgment within a time period after forwarding of the documentation, the system may provide a reminder to the repair facility and/or the insured, provide a workflow assignment to a claim handler to contact the repair facility, and/or close the estimate and instruct the claimant to obtain a new estimate from a different repair facility.

In embodiments, an insurance data system may be configured to provide one or more notifications to claimants and/or to repair facilities as steps are performed during the processing of a claim. By way of example, notifications may be provided to claimants when an estimate is received, when an estimate is approved, when an estimate is forwarded to a claim handler, when an estimate is revised by a claim handler, when a revised estimate is provided to a repair facility, when a repair facility provides a revised estimate for review, and at other events. In embodiments, notifications may be provided via e-mail, text message, social network message, or other communication. In embodiments, the claimant may have an option to access a web page, or other electronic resource; upon claimant request to access, and providing of suitable credentials, systems such as a web system and insurance data system may be configured to access a database storing data relating to claim status and processing, and populate a web page or other resource with a listing and/or graphical representation of steps completed or of steps to be completed in connection with processing of the claim. Similarly, notifications may be provided to repair facilities at steps during the processing of a claim. The repair facility may be provided with an option to access a web page or other graphical resource, which may similarly be populated in response to a request and providing of credentials. In embodiments, the notifications may be provided via an application program or app running on a repair facility device, which application program causes the device to access a database to retrieve, and display, data relating to steps completed and/or yet to be completed in connection with claim processing.

Embodiments of the present system provide different logic depending on whether a repair facility that submitted an estimate is within an insurance company's network or not in the insurance company's network. However, more than these two categories of repair facility may be provided, with varying estimate review logic depending on the category. In an embodiment, different logic may be provided based on experience of a repair facility. By way of example, repair facilities may be categorized based on percentage of estimates that are approved or disapproved, or percentages of estimates that are modified by a claim handler. A category defined as including repair facilities whose estimates have been modified at a rate of less than 5% in the past year (or other time period) may be subject to a higher threshold than a category defined as repair facilities whose estimate have been modified at a higher rate. Categories may be defined for repair facilities having estimates modified in one or more average ranges of dollar value for a time period, for example. An insurance data system may periodically, or based on a non-periodic trigger, access one or more databases containing data as to estimates, which records identify the repair facility, whether or not the estimate was modified, the amount of the modification, the date of the estimate and other relevant dates, and other information, access estimates associated with a repair facility, determine data, such as statistical data relating to review of estimates associated with the repair facility, and associate a category with the repair facility based on the result of the review of the estimates and definitions of the categories.

In embodiments, in the event that the estimate amount is above a threshold, the system may be configured to modify an insurance workflow to cause an assignment to be generated for an appraiser to conduct a personal inspection of a damaged vehicle. There may be a plurality of thresholds, and the appropriate threshold to apply for a given estimate may be determined by the system based on factors such as whether the repair shop is a network facility or a non-network facility.

Figure 11:
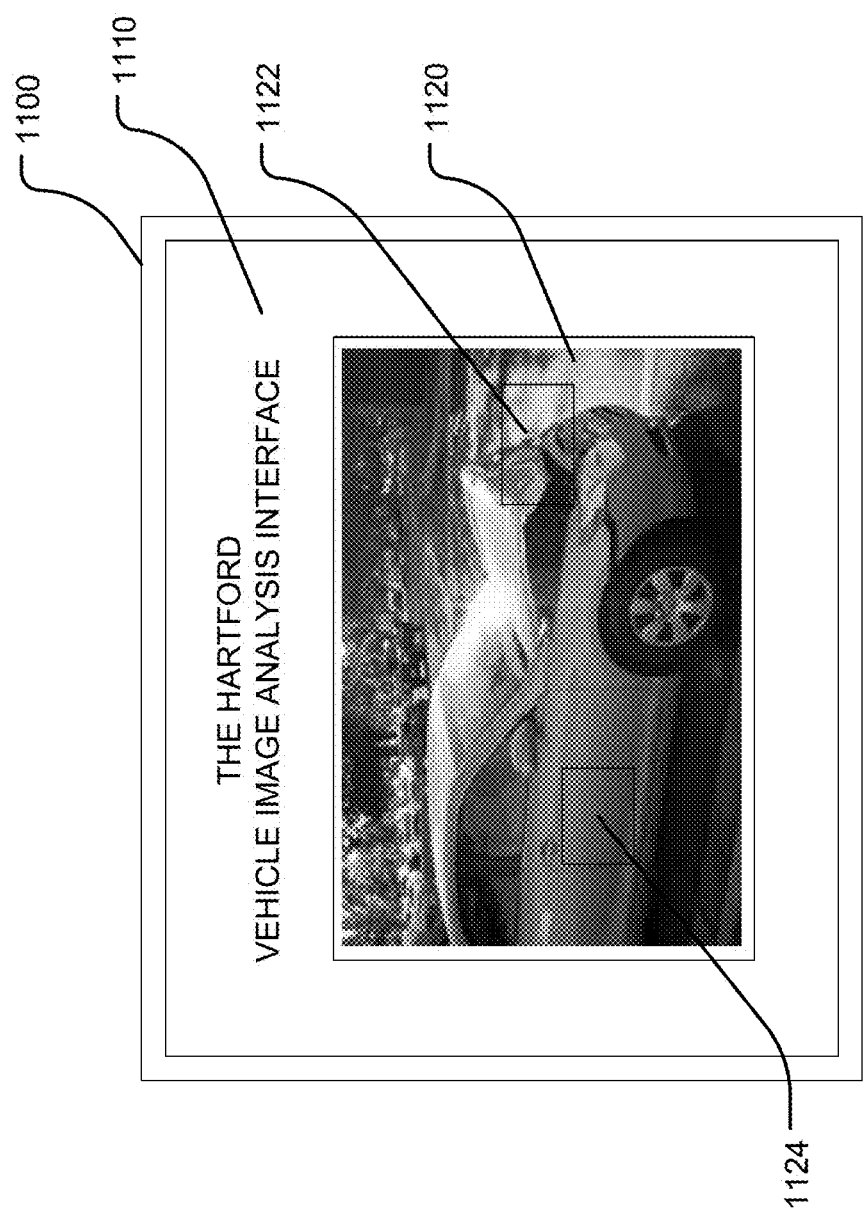
FIG. 11 is an illustration of an insurance company personnel device displaying an image and related analysis data according to an illustrative embodiment of the invention.

In an embodiment, an estimate generated in an automated manner using digital image data of a damaged vehicle may be received and compared to an estimate received from a repair facility. The estimate may be generated by providing the digital image data and other data associated with the claim, such as vehicle identification information, to a third party computer system. In other embodiments, the insurance data system or another system of FIG. 2 may include one or more modules configured to receive digital image data, compare the digital image data to rules and other data relating to repair items and costs of same, and generate an estimate. For example, referring to FIG. 11, device 1100 is displaying an interface screen 1110 of an image analysis module. The image analysis module may be configured to analyze portions of the image, correlate the image portions to a baseline image of a same make and model of car, and identify image portions that reflect damage, and those that do not reflect damage. For example, in the image 1120 on interface screen 1110, image portion 1122 corresponds to a front portion of a depicted vehicle, and will be identified as having experienced damage. Image portion 1124 corresponds to a passenger side door panel that has not sustained damage. Thus, an estimate may be generated including parts and associated labor time for replacement of parts in image portion 1122, such as a hood and front grill, but not including a passenger side door panel depicted in image portion 1124. The generated estimate may be compared to the estimate received from the repair facility. The system may have rules that require workflow modifications selectively depending on a result of a comparison. By way of example, if the estimate generated based on image data and the estimate received from the repair facility differ in excess of a threshold, which may be a percentage and/or an absolute dollar value, a percentage and/or an absolute labor time, or a combination of same, and/or if the estimates differ in excess of a threshold in the identity of parts to be obtained and tasks to be performed, then the system may provide the estimate to a claim handler device for claim handler review and updating. For example, if an estimate received from a repair facility for repairs to the damage shown in image 1120 included a passenger side door panel, the system would modify a workflow to provide the estimate to a claim handler device for claim handler review and updating.

In embodiments, rules may be updated on a variety of bases. For example, rules, prices, labor times and/or labor rates may be adjusted during a calendar or fiscal year based on one or more factors, such as seasonal changes in one or more of those factors. Prices of parts may be determined based on searches of databases, Internet resources and other resources, and updated in the system. Searches for parts pricing updates may be conducted on a periodic rolling basis for all parts. In embodiments, searches for parts pricing updates may be performed on a real time basis by the system during evaluation of an estimate including the part. In embodiments, the system may maintain in memory a time of a most recent search for price data a given part, and, upon receipt of an estimate including the given part, determine whether the most recent search for price data is sufficiently recent. Searches may include separate searches for aftermarket parts, recycled parts, used parts, and original equipment manufacturer (OEM) parts. Similarly, labor market adjustments, based on geographic regions, may be made on a frequent basis.

In embodiments, one or more predictive models may be developed and employed to make determinations as to rules.

In embodiments, a rule analysis module may be implemented to review rules and provide rule change recommendations. For example, rules data analysis may include an identification of rules that most frequently result in a claim handler overruling the exception and approving the estimate item that triggered the rule. Rules data analysis may include determining amounts of savings associated with triggering of a given rule, and costs associated with triggering of the rule, such as claim handler time associated with triggering of the rule. Using factors such as numbers of incorrectly triggered rules, potential savings from a trigger of a rule, and review cost, the value of a rule can be assessed. For example, for a rule with low potential savings, a high percentage of incorrect triggers, and high staff costs, the rule may be removed or modified. Other factors may be included in the rules assessment. The rules updates may be implemented automatically, based on one or more algorithms that establish a threshold minimum rule value, or a rule that fails a test may be referred, in an insurance workflow, to a rule reviewer to determine if the rule is to be maintained.

Data storage in connection with one or more embodiments described herein may be spread across one or more computer-readable storage media, and may be or include one or more relational databases, hierarchical databases, object-oriented databases, one or more flat files, one or more spreadsheets, and/or one or more structured files. Databases may be managed by one or more database management systems, which may be based on a technology such as Microsoft SQL Server, MySQL, Oracle Relational Database Management System (RDBMS), PostgreSQL, a NoSQL database technology, and/or any other appropriate technology.

User interaction with one or more computer systems described herein may be mediated via one or more web site systems. The web site systems may generate one or more web pages for access by user devices, such as user devices 245, 307, by way of example, and may receive responsive information from user devices, such as claim information, identification information, and credentials or other data to facilitate secure access to estimate information. The web site systems may then communicate this information to other systems described herein.

The web site systems may include web application modules and HyperText Transfer Protocol (HTTP) server modules. The web application modules may generate the web pages that make up the web sites for presentation to repair facility representatives, claimants, administrators, claim handlers, and others, and that are communicated by the HTTP server modules. Web application modules may be implemented in and/or based on a technology such as Active Server Pages (ASP), PHP: Hypertext Preprocessor (PHP), Python/Zope, Ruby, any server-side scripting language, and/or any other appropriate technology.

HTTP server modules may implement the HTTP protocol, and may communicate HyperText Markup Language (HTML) pages and related data from the web site to/from computer systems and/or client devices using HTTP. HTTP server modules may be, for example, Sun-ONE Web Servers, Apache HTTP servers, Microsoft Internet Information Services (IIS) servers, and/or may be based on any other appropriate HTTP server technology. Web site systems may also include one or more additional components or modules, such as one or more switches, load balancers, firewall devices, routers, and devices that handle power backup and data redundancy.

User devices may include web browser modules, which may communicate data related to the web site to/from HTTP server modules and the web application modules of web site systems. Such a web browser module may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module may implement Rich Internet Application (RIA) and/or multimedia technologies such as Adobe Flash, Microsoft Silverlight, and/or other technologies. The web browser module may implement RIA and/or multimedia technologies using one or web browser plug-in modules (such as, for example, an Adobe Flash or Microsoft Silverlight plugin), and/or using one or more sub-modules within the web browser module itself. The web browser modules may display data on one or more displays that are included in or connected to the user device such as a liquid crystal display (LCD) display, organic light-emitting diode (OLED) display, touch screen or monitor. The user devices may receive input from the user of the user device from input devices that are included in or connected to the user device, such a mouse or other pointing device, or a touch screen, and provide data that indicates the input to the web browser module.

User devices may download, store and execute special-purpose application programs, or apps, to implement one or more of the steps and methods described herein. By way of example, smartphones, tablets and other portable and wireless devices for use by repair facility owners and employees may access, download, configure, store and execute one or more apps for accessing estimate data and furnishing estimate data to insurer computer systems, applying initial error checking and format conversion processing on estimate data, applying some or all of the rules of the repair rules database prior to submission of the estimate to the insurer system, and other functionality. Similarly, smartphones, tablets and other portable and wireless devices for use by claim adjusters and system administrators may access, download, configure, store and execute one or more apps for reviewing results of estimate verifications, approving or modifying estimates, and reviewing and modifying rules.

As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

One or more public cloud, private cloud, hybrid cloud and cloud-like networks may also be implemented, for example, to handle and conduct processing of one or more transactions or processing of the present invention. Cloud based computing may be used herein to handle any one or more of the application, storage and connectivity requirements of the present invention. For example one or more private clouds may be implemented to handle receipt and review of estimates, providing of estimate results to claim handlers, sharing of estimates between repair facility computer systems and insurer systems, and related data processing requirements. Furthermore, any suitable data and communication protocols may be employed to accomplish the teachings of the present invention.

The flow charts described herein do not imply a fixed order to the steps, and embodiments of the present invention may be practiced in any order that is practicable. In embodiments, one or more steps of the methods may be omitted, and one or more additional steps interpolated between described steps. Note that any of the methods described herein may be performed by hardware, software, or any combination of these approaches. For example, a non-transitory computer-readable storage medium may store thereon instructions that when executed by a processor result in performance according to any of the embodiments described herein. In embodiments, each of the steps of the methods may be performed by a single computer processor or CPU, or performance of the steps may be distributed among two or more computer processors or CPU's of two or more computer systems. In embodiments, one or more steps of a method may be performed manually, and/or manual verification, modification or review of a result of one or more processor-performed steps may be required in processing of a method.

The embodiments described herein are solely for the purpose of illustration. Those in the art will recognize that other embodiments may be practiced with modifications and alterations limited only by the claims.

What is claimed is:

1. A computer system for processing data associated with vehicle repair estimates in connection with insurance claims, comprising:
   one or more data storage devices storing:
   an insurance claims database having data relating to a plurality of insurance claims;
   one or more computer processors;
   a data communications device in communication with the one or more computer processors;
   a memory device in communication with the one or more computer processors, and storing computer-readable instructions, which instructions, when executed by the one or more computer processors, cause the one or more computer processors to:
   access, via the data communications device, a vehicle repair rules database storing data indicative of a plurality of vehicle repair rules including two or more of staff threshold rules, compliance rules, gross estimate threshold rules, percentage of vehicle actual cash value rules, mechanical hours rules, mechanical total rules, and gross estimate difference rules;
   establish, via the data communications device, secure communications with the repair facility computer system by providing the repair facility computer system code for creation of a virtual drive on the repair facility computer system, wherein the virtual drive is configured to receive repair estimate data from the repair facility computer system and make the repair estimate data available to the computer system;

receive claim identifying data from a repair facility computer system; determine, based on the claim identifying data, an insurance claim associated with the claim identifying data;

receive data indicative of a repair estimate associated with the insurance claim from the repair facility computer system;

access data indicative of an evaluation of the received repair estimate, the evaluation being based on an application of the plurality of vehicle repair rules to the repair estimate; and responsive to the data indicative of a value of the repair estimate being below a first threshold value, determine an insurance workflow to include forwarding the estimate for approval without forwarding the estimate to a claim handler device for review;

responsive to the data indicative of the value of the repair estimate being equal to or greater than the first threshold value, and the evaluation being indicative of one or more of the plurality of vehicle repair rules being triggered;

determine an insurance workflow to include forwarding the estimate to a claim handler device for review; and render, for display on the claim handler device, a user interface including a top portion and a bottom portion, the top portion displaying a listing of conditions requiring review and the bottom portion displaying a listing of each item of the estimate including separate columns for parts, labor cost, and applicable rate;

responsive to the data indicative of the value of the repair estimate being equal to or greater than the first threshold value, and the evaluation being indicative of no rules being triggered, determine an insurance workflow to include forwarding the estimate for approval without forwarding the estimate to a claim handler device for review;

store, in the one or more data storage devices, a plurality of digital image data estimate rules for comparing an estimate based on digital image data to data indicative of a repair estimate received from the repair facility computer system;

receive, by the one or more computer processors, digital image data of the vehicle;

analyze, by a vehicle image analysis module, the digital image data of the vehicle and a baseline image of a same make and model of the vehicle, to identify vehicle parts that are damaged;

generate, based on the identified vehicle parts that are damaged, a digital image estimate to repair the damage;

access data indicative of an evaluation of the digital image estimate, the evaluation being based on an application of the plurality of digital image data estimate rules to the digital image estimate;

responsive to the data indicative of an identity of parts in the repair estimate differing from the identity of parts in the digital image estimate by greater than at least a second threshold, determine an insurance workflow to include forwarding the estimate to a claim handler device for review; and responsive to the data indicative of the identity of parts in the repair estimate differing from the identity of parts in the digital image estimate by less than the at least second threshold, determine an insurance workflow to include forwarding the estimate for approval without review by a claim handler.

2. The computer system of claim 1, further comprising the claim handler device in communication with the one or more computer processors.

3. The computer system of claim 2, further comprising a payment system in communication with the claim handler device, the payment system being configured to effect payment responsive to instructions received from the claim handler device.

4. The computer system of claim 2, wherein the claim handler device is configured to, responsive to receiving the estimate for review, display claim information including a listing of triggered ones of the plurality of rules.

5. The computer system of claim 4, wherein the claim handler device is further configured to receive claim handler instructions to provide a modified estimate to the repair facility computer system, and to provide data indicative of the modified estimate to the one or more computer processors, and wherein the instructions further cause the one or more computer processors to, responsive to receipt of the data indicative of the modified estimate, provide the modified estimate to the repair facility computer system.

6. The computer system of claim 1, further comprising a communications device in communication with the one or more processors, the communications device being configured to provide estimate data to a claimant device.

7. The computer system of claim 1, wherein the accessing data indicative of an evaluation associated with the repair estimate comprises receiving the evaluation from an intermediary computer system.

8. The computer system of claim 1, wherein the instructions further cause the one or more processors to apply the plurality of rules to the estimate data prior to the accessing the data indicative of an evaluation.

9. The computer system of claim 1, wherein the instructions further cause the one or more processors to:
determine whether the repair facility is a network facility or a non-network facility,
responsive to determining that the repair facility is a network facility, and the estimate amount being below a second threshold, higher than the first threshold, determine an insurance workflow to include forwarding the estimate for approval; and
responsive to determining that the repair facility is a non-network facility, or that the estimate amount is not below the second threshold, determine an insurance workflow to include forwarding the estimate to a claim handler device for review.

10. The computer system of claim 1, wherein the one or more computer processors are further configured to communicate modifications to a rules database for use in generating the evaluation.

* * * * *